US008151276B2

(12) United States Patent
Grechanik et al.

(10) Patent No.: US 8,151,276 B2
(45) Date of Patent: Apr. 3, 2012

(54) TEST SCRIPT TRANSFORMATION ANALYZER WITH CHANGE GUIDE ENGINE

(75) Inventors: Mark Grechanik, Chicago, IL (US); Qing Xie, Chicago, IL (US); Chen Fu, Downers Grove, IL (US)

(73) Assignee: Accenture Global Services GmbH, Dublin (IE)

( * ) Notice: Subject to any disclaimer, the term of this patent is extended or adjusted under 35 U.S.C. 154(b) by 1035 days.

(21) Appl. No.: 12/038,676

(22) Filed: Feb. 27, 2008

(65) Prior Publication Data
US 2009/0217303 A1    Aug. 27, 2009

(51) Int. Cl.
*G06F 3/00* (2006.01)
*G06F 9/44* (2006.01)

(52) U.S. Cl. ............... 719/316; 717/115; 717/124
(58) Field of Classification Search .......... 719/310, 719/316; 717/124, 115, 316
See application file for complete search history.

(56) References Cited

U.S. PATENT DOCUMENTS

| | | | |
|---|---|---|---|
| 5,781,720 A | 7/1998 | Parker et al. | |
| 6,216,212 B1 | 4/2001 | Challenger et al. | |
| 6,898,764 B2 * | 5/2005 | Kemp | 715/762 |
| 6,990,654 B2 | 1/2006 | Carroll, Jr. | |
| 7,165,240 B2 * | 1/2007 | Patterson | 717/116 |
| 2003/0052917 A1 | 3/2003 | Dubovsky | |
| 2003/0202012 A1 | 10/2003 | Kemp | |
| 2003/0236775 A1 | 12/2003 | Patterson | |
| 2004/0002989 A1 | 1/2004 | Kaminer | |
| 2005/0166094 A1 | 7/2005 | Blackwell et al. | |
| 2005/0204343 A1 | 9/2005 | Kisamore et al. | |
| 2005/0235274 A1 | 10/2005 | Mamou et al. | |
| 2006/0230314 A1 | 10/2006 | Sanjar et al. | |
| 2007/0143327 A1 | 6/2007 | Rivas et al. | |
| 2007/0240116 A1 | 10/2007 | Bangel et al. | |
| 2007/0271203 A1 | 11/2007 | Delvat | |
| 2008/0282230 A1 | 11/2008 | Belvin et al. | |

OTHER PUBLICATIONS

Joel Doleac, A graphic User interface(GUI) for Generating NPS Autonomous Underwater Vehicle(AUV) Execution Script Files, Aug. 1999.*
Extended European Search Report dated Feb. 10, 2011 for corresponding European Patent Office Application No. 09250551.0.
Memon et al., "Regression Testing of GUIs," Proceedings of ESEC/FSE '03, Sep. 1-5, 2003, pp. 118-127, Helsinki, Finland, XP-002617924.
Memon et al., "Automating Regression Testing for Evolving GUI Software," *Journal of Software Maintenance and Evolution: Research and Practice*, vol. 17, No. 1, Jan. 1, 2005, pp. 27-64, XP002617925.
Compuware, The Leader in IT Value, "Accelerate Testing and Deliver High Quality Applications on Time," 2008 Compuware Corporation, 2 pages.

(Continued)

*Primary Examiner* — Lechi Truong
(74) *Attorney, Agent, or Firm* — Brinks Hofer Gilson & Lione

(57) ABSTRACT

A script analyzer with change guide generates accurate test scripts for evolving applications. Applications often have complex graphical user interfaces for which the permutations and combinations of GUI elements give rise to an enormous field of potential commands and command sequences to be tested. Furthermore, these applications change over time, rendering prior test scripts unworkable. The script analyzer automatically generates new test scripts to reliably test subsequent application versions, while greatly reducing the time, cost, and resource expenditures needed to arrive at subsequent application versions.

21 Claims, 17 Drawing Sheets

OTHER PUBLICATIONS

Grechanik et al., "Reducing Effort in Script-Based Testing," Accenture Technology Labs, Systems Integration Group, Chicago, Illinois, Nov. 11, 2007, pp. 1-22.

Hewlett-Packard Development Company, "HP Functional Testing Software, BTO Software," 2008, 1 page.

Hewlett-Packard Development Company, HP QuickTest Professional Software, data sheet, 2007, 4 pages.

IBM, "Rational Robot, Features and Benefits," "Rational Software," undated, 1 page.

IBM, "Rational Robot, Overview," "Rational Software," undated, 1 page.

Pierce, Benjamin C., "Types and Programming Languages," The MIT Press, Cambridge, Massachusetts, 2008, ISBN 0-262-16209-1, complete book.

United States Patent and Trademark Office Action dated Sep. 28, 2011 for co-pending U.S. Appl. No. 12/038,672.

United States Patent and Trademark Office Action dated Sep. 29, 2011 for co-pending U.S. Appl. No. 12/038,665.

First Office Action dated Jun. 24, 2011 for co-pending Chinese Patent Application No. 200910118531.X with English translation.

* cited by examiner

School
File Edit Record

States List

| Alabama | Indiana | Nevada | South Dakota |
| Alaska | Iowa | New Hampshire | Tennessee |
| Arizona | Kansas | New Jersey | Texas |
| Arkansas | Kentucky | New Mexico | Utah |
| California | Louisiana | New York | Vermont |
| Colorado | Maine | North Carolina | Virginia |
| Connecticut | Maryland | North Dakota | Washington |
| Delaware | Massachusetts | Ohio | West Virginia |
| Florida | Michigan | Oklahoma | Wisconsin |
| Georgia | Minnesota | Oregon | Wyoming |
| Hawaii | Mississippi | Pennsylvania | |
| Idaho | Montana | Rhode Island | |
| Illinois | Nebraska | South Carolina | |

Select State

Dartmouth

State: Dartmouth
Location:
Control:
Number of Students (1000):

Academic Emphasis

Male/Female Ratio
SAT-verbal
Expenses (1000$)
Number of Applicants (1000)
Percent Enrolled
Social (1-5)

Student/Faculty Ratio
SAT-math
Financial Aid
Percent of Admittance
Academics (1-5)
Quality of Life (1-5)

GAP Vn+1

```
<GUIElement Type="StateListbox">

<Version>0
    <ParentChildIdentifier>XYZ123</ParentChildIdentifier>
    <UniqueID>0x410</UniqueID>
    <HWND>0x90b58</HWND>
    <Location x="175" y="88" width="364" height="253" />
    <Class>WindowsForms10.LISTBOX.app4</Class>
    <Style>0x56110ac1</Style>
    <ExStyle>0xc0000a00</ExStyle>
    - <Values>
           ..........
L11        <Value SeqNumber="8" Version="0">District of Columbia</Value>
           ..........
    </Values>
  </Version>

<Version>1
    <ParentChildIdentifier>XYZ345</ParentChildIdentifier>
    <UniqueID>0x9a</UniqueID>
    <HWND>0x80e56</HWND>
    <Location x="250" y="137" width="488" height="208" />
    <Class>WindowsForms10.LISTBOX.app.0.378734a</Class>
    <Style>0x56010ac1</Style>
    <ExStyle>0xc0000a00</ExStyle>
    - <Values>
           ..........
L23        <Value SeqNumber="8" Version="1">Florida</Value
           ..........
    </Values>
  </Version>

</GUIElement>
```

Figure 5

'Test script for the Current GAP GUI to open file, select a school (Acme State University),
'change the academic scale from 2 to 3 and save to a new file

164

L1   Window("StateList").WinObject("Open File").Click 86,12
L2   Window("StateList").Dialog("Open").WinListView("SysListView32").Select "university.data"
L3   Window("StateList").Dialog("Open").WinButton("Open").Click
L4   Window("StateList").WinObject("StateListbox").Click 31,7
L5   Window("StateList").WinObject("Select State").Click 36,14
L6   Window("StateList").WinObject("SchoolListbox").Click 19,22
L7   Window("StateList").WinObject("Select School").Click 67,12
L8   Window("StateList").WinObject("AcadScale").Drag 18,14
L9   Window("StateList").Drop 698,471
L10  Window("StateList").WinObject("AcadScale").Type "3"
L11  Window("StateList").WinObject("Save Change").Click 108,7
L12  Window("StateList").WinObject("Save File").Click 70,16
L13  Window("StateList").Dialog("Save a Data Record").WinEdit("File name:").Set "university_revise.data"
L14  Window("StateList").Dialog("Save a Data Record").WinButton("Save").Click

'Test script for the Subsequent GAP GUI to open file, select a school (Acme State University),
'change the academic scale from 2 to 3 and save to a new file

```
L1   Window("School").Window("Window").Click 63,15
L2   Window("School").Dialog("Open").WinToolbar("ToolbarWindow32").Press "My Computer"
L3   Window("School").Dialog("Open").WinListView("SysListView32").Activate "Local Disk (C:)"
L4   Window("School").Dialog("Open").WinListView("SysListView32").Activate "University"
L5   Window("School").Dialog("Open").WinComboBox("Files of type:").Select "All files (*.*)"
L6   Window("School").Dialog("Open").WinListView("SysListView32").Select "university.data"
L7   Window("School").Dialog("Open").WinButton("Open").Click
L8   Window("School").WinObject("StateListbox").Click 31,10
L9   Window("School").WinObject("Select State").Click 51,12
L10  Window("School").WinObject("SchoolCombobox").Click 294,14
L11  Window("School").WinEdit("Edit").Set "Acme State University"
L12  Window("School").WinEdit("Edit").Type micReturn
L13  Window("School").WinObject("2").Drag 15,12
L14  Window("School").WinObject("Academics (1-5)").Drop 73,2
L15  Window("School").WinObject("2").Type "3"
L16  Window("School").WinObject("menuStrip1").Click 101,15
L17  Window("School").Window("Window").Click 69,63
L18  Window("School").WinObject("menuStrip1").Click 97,12
L19  Window("School").Window("Window").Click 52,54
L20  Window("School").Dialog("Save As").WinComboBox("Save as type:").Select "All files (*.*)"
L21  Window("School").Dialog("Save As").WinEdit("File name:").Set "university_revise2.data"
L22  Window("School").Dialog("Save As").WinEdit("File name:").Type micReturn
```

<GUIElement Type="SchoolListbox">
  <Version>0
L3  - <GUIElement Alias="SchoolListbox" Version="0">
       <ParentChildIdentifier>XYZ321</ParentChildIdentifier>
       <UniqueID>0x3c2</UniqueID>
       <HWND>0x90b52</HWND>
       <Location x="173" y="486" width="336" height="274" />
       <Class>WindowsForms10.LISTBOX.app4</Class>
       <Style>0x560100c1</Style>
       <ExStyle>0xc0000a00</ExStyle>
....
     </GUIElement>
  </Version>

L13  <Version>1
L14 - <GUIElement Alias="SchoolCombobox" Version="1">
        <ParentChildIdentifier>XYZ654</ParentChildIdentifier>
        <UniqueID>0xa8</UniqueID>
        <HWND>0x90e66</HWND>
        <Location x="248" y="653" width="299" height="24" />
        <Class>WindowsForms10.COMBOBOX.app.0.378734a</Class>
        <Style>0x56010242</Style>
        <ExStyle>0xc0000800</ExStyle>
  ...........
     </GUIElement>

</Version>
```

Figure 15

TEST SCRIPT TRANSFORMATION ANALYZER WITH CHANGE GUIDE ENGINE

CROSS REFERENCE TO RELATED APPLICATIONS

This application is related to following applications, all filed on the same day:
- U.S. patent application Ser. No. 12/1038,665, filed Feb. 27, 2008;
- U.S. patent application Ser. No. 12/038,672, filed Feb. 27, 2008;
- U.S. patent application Ser. No. 12/038,661, filed Feb. 27, 2008;
- U.S. patent application Ser. No. 12/038,658, filed Feb. 27, 2008; and
- U.S. patent application Ser. No. 12/038,675, filed Feb. 27, 2008.

BACKGROUND OF THE INVENTION

1. Technical Field

This disclosure relates to analysis and generation of test scripts for testing graphical user interface applications, and in particular relates to transforming a prior test script for use with a new application version.

2. Related Art

The relentless pace of advancing technology has given rise to complex computer software applications to help automate almost every aspect of day-to-day existence. Today applications exist to assist with writing novels to filing income tax returns to analyzing historical trends in baby names. One nearly ubiquitous feature of these applications is that they employ graphical user interfaces (GUIs). Another nearly ubiquitous aspect is that the GUI APplications (GAPs) require thorough testing prior to release.

Nevertheless, in the past it has been easier to implement the GUI to the application than to thoroughly test the GAP. For GAPs of any significant complexity, the permutations and combinations of GUI elements gives rise to an enormous field of potential commands and command sequences that could have bugs of any severity, from insignificant to critical failure. Exacerbating the problem is that application developers are under pressure to continually add new features, update the GUI, and release new versions of applications. As a result, even if a test script for a prior version of a GAP were adequate, it is rarely the case that the original test script can adequately test the subsequent revised application.

Manually testing large-scale enterprise GAPs is tedious, error prone, and laborious. Nontrivial GAPs contain hundreds of GUI screens that in turn contain thousands of GUI objects. In order to automate testing of GAPs, test engineers write programs using scripting languages (e.g., JavaScript and VBScript), and these testing scripts drive GAPs through different states by mimicking users who interact with these GAPs by performing actions on their GUI objects. Often test scripts simulate users of GAPs, and their statements access and manipulate GUI objects of these GAPs. For example, the statement:

VbWindow("Login").VbEdit("txtAgentsName").Set "Shawn"

locates a window whose caption is Login and that is created by a Visual Basic-based control, then it locates a text box whose name is txtAgentsName that is a GUI object whose parent is the login window. By calling the method Set with the parameter "Shawn", the value of the text box is set to "Shawn".

Commercial tools such as Quick Test Pro (QTP), Rational Robot, and Compuware Test Partner help generate test scripts by tracking pointing of a cursor at GUI objects and performing desired actions. These tools generate scripting code that can replay captured user actions. The generated code serves as a skeleton for creating scripts to automate script testing. Test engineers add code to the generated scripts so that these scripts can replay using different input values thereby exercising the functionality of the GAP.

Expanding test scripts with manually written code to automate tests makes the test script more complex, difficult to understand, maintain, and evolve. Although it is known in advance that the test scripts access and manipulate GUI elements, it is not clear how to detect operations at compile time that lead to runtime errors. Using API calls exported by testing platforms remains a primary mode of accessing and manipulating GUI objects of GAPs, and these API calls lead to various run-time errors in the test scripts. For example, test personnel may use platform API calls incorrectly in the test script source code thereby accessing GUI elements that test personnel did not intend to access.

It is a difficult technical challenge to check test scripts for potential flaws caused by third party API calls that lead to incorrect tests and runtime errors in the test scripts. Furthermore, there are fundamental problems with using API calls to access and manipulate GUI objects. First, the API calls take names and property values of GUI objects as string input parameter variables. The values of these input parameters are often known only at runtime, making it impossible to apply sound checking algorithms. Second, testing platforms export dozens of different API calls, and high complexity of these API calls makes it difficult for programmers to understand which API calls to use and how to combine them to access and manipulate GUI objects. These problems lead to a wide range of bugs in the test scripts, many of which are difficult to detect during the inspection of the test script source code.

A further problem arises because application requirement specifications include high-level concepts that describe GAPs, specifically its GUI objects. Unfortunately, tracing GUI objects of GAPs to these high-level concepts is a difficult problem because programmers do not document these traces. Accordingly, when test personnel create GAPs, they spend considerable time to understand how to use these GAPs by reading documentation and talking to subject matter experts. This crucial knowledge is often lost after test personnel are reassigned to other tasks or quit the company.

One of the perceived benefits of existing approaches to creating test scripts is that type checking is not required since the script code is generated directly from GUIs. For example, given certain GUI objects in a GAP, a testing tool can produce corresponding statements that navigate to these objects using API calls with string parameters that describe their properties. However, this perceived benefit in fact gives rise to difficult technical challenges due to semantic inconsistencies between the test script and the GAP. Suppose, for example, that during the maintenance phase the GUI of the GAP changed. The scripting interpreter is not aware of the change and it would run the generated script without producing any compile-time warnings that test engineers can follow to fix potential problems in these scripts. However, the resulting script either fails at run time or produces incorrect test results because its code attempts to access GUI objects that are either changed or do not exist anymore.

Therefore, a need exists to address the problems noted above and other previously encountered.

SUMMARY

A test script transformation analyzer with change guide engine ("script analyzer") generates accurate test scripts for applications with graphical user interfaces that change over time. As the applications change, prior test scripts are rendered unworkable. The script analyzer facilitates the automatic generation of new test scripts to reliably test subsequent application versions and may greatly reduce the time, cost, and resource expenditures needed to arrive at the new test scripts.

The script analyzer may accept as input a GUI difference model and GUI element metadata. The GUI difference model specifies GUI element differences between a current GAP version and a subsequent GAP version. The script analyzer architecture further includes a script analyzer. Based on an abstract syntax tree representation of a current test script, the script analyzer generates a change guide, a transformed test script, or both. The change guide may include, for example, script transformation information for transforming the current test script for use against the subsequent GAP version. The transformed test script (for use against the subsequent GAP version) may include, for example, modified script entries generated from current test script entries in the current test script.

The script analyzer with change guide provides a system and method for generating a transformed test script for a subsequent GAP version arising from a current GAP version to test the subsequent GAP. The script analyzer includes a processor, and a memory coupled to the processor. The memory of the script analyzer includes difference model logic that produces a GUI difference model that captures a GUI element change from the current GAP to the subsequent GAP for a specific GUI element. The script analyzer also includes script analysis logic that receives the GUI difference model and a current test script representation for a current test script for testing the current GAP. The current test script representation includes a test script statement vector that navigates to GUI objects in the current GAP. The script analysis logic locates, in an object repository, a GUI object entry matching the test script statement vector and locates, in the GUI difference model, a GUI element difference entry matching the GUI object entry. The script analysis logic analyzes the GUI element difference entry to determine whether the specific GUI element has changed. The script analysis logic outputs a change specifier for the current test script, when the GUI element analysis determines that the GUI element has changed. The change specifier may include a change guide message, a transformed script statement vector, or both.

Other systems, methods, features and advantages will be, or will become, apparent to one with skill in the art upon examination of the following figures and detailed description. All such additional systems, methods, features and advantages are included within this description, are within the scope of the claimed subject matter, and are protected by the following claims.

BRIEF DESCRIPTION OF THE DRAWINGS

The SAA may be better understood with reference to the following drawings and description. The elements in the figures are not necessarily to scale, emphasis instead being placed upon illustrating the principles of the system. In the figures, like-referenced numerals designate corresponding parts throughout the different views.

FIG. 2 shows a GUI of a current GAP version.

FIG. 3 shows a GUI of a subsequent GAP version.

FIG. 5 illustrates a GUI element difference entry.

FIG. 6 shows a current test script.

FIG. 11 shows a transformed test script.

FIG. 15 show another example GUI element difference entry.

DETAILED DESCRIPTION OF THE PREFERRED EMBODIMENTS

Figure 1:
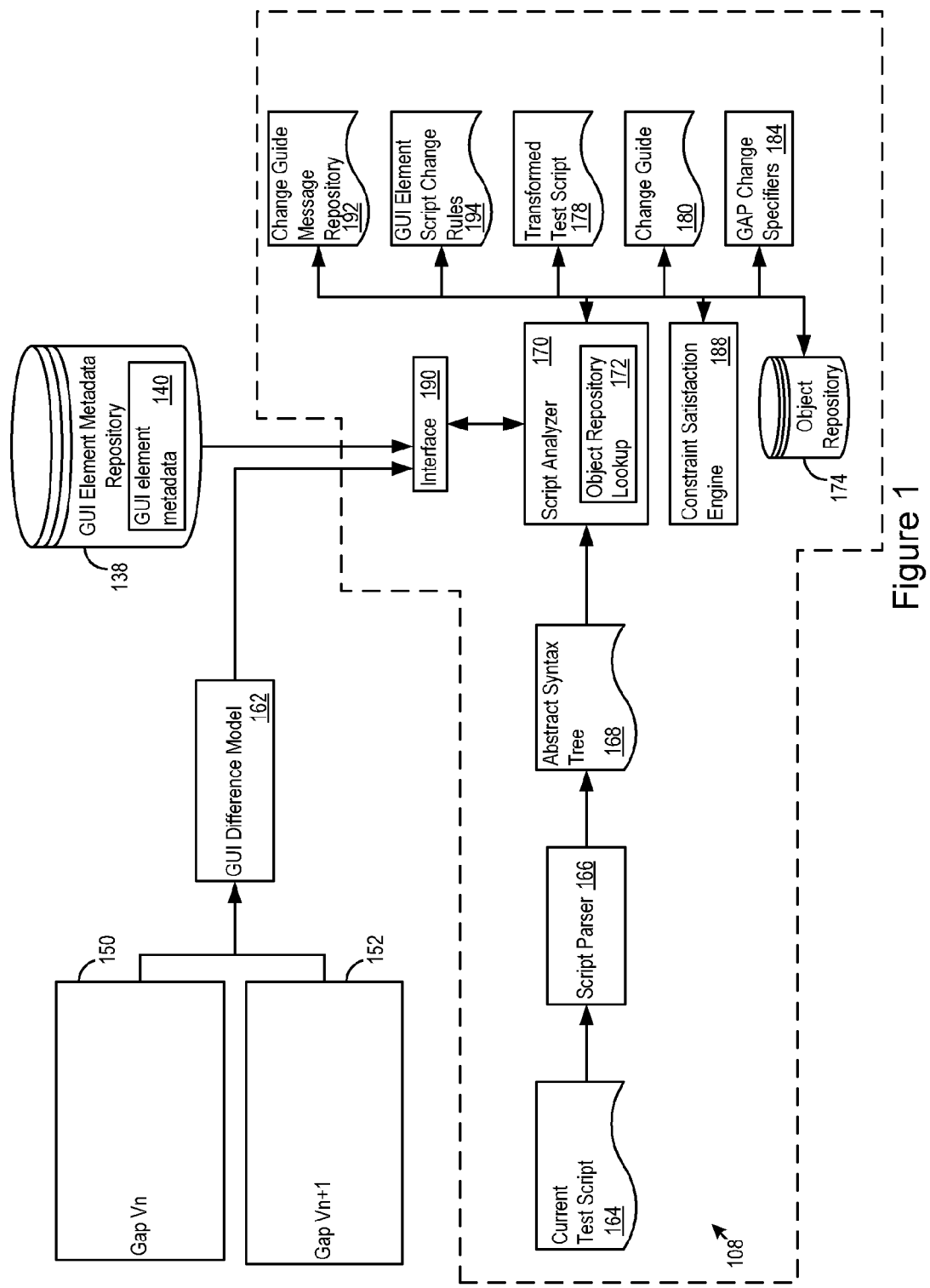
FIG. 1 shows a script analyzer with change guide engine architecture.

FIG. 1 shows a script analyzer with change guide architecture (SAA) 108. Although detailed descriptions of the features of the SAA 108 will be provided further below, a brief introduction of the SAA 108 will first be presented. The SAA 108 receives a GUI difference model 162 that specifies GUI element differences between a current GAP version 150 and a subsequent GAP version 152. The GUI difference model 162 may be represented as an XML schema. In another implementation, the current and subsequent GAP tree models, as well as the GUI difference model 162 are implemented as relational models stored in a database. The SAA 108 employs an interface 190 to receive inputs and communicate with various components, including a GUI element metadata repository 138. The GUI element metadata repository 138 may provide detailed information regarding the GUI elements represented in the GUI difference model 162, the current GAP 150 and the subsequent GAP 152. In one implementation, the SAA 108 includes a script parser 166 that parses a current test script 164 to obtain an intermediate representation of the current test script 164. The intermediate representation may be an abstract syntax tree (AST) 168 or other representation of the current test script 164. The SAA 108 employs a script analyzer 170 that analyzes the AST 168 and invokes an object repository lookup 172 against an object repository 174 to locate the properties of GUI elements identified by the AST 168. The script analyzer 170 uses the GUI element metadata repository 138, object repository 174, a constraint satisfaction engine 188, and GUI element script change rules 194 to locate valid GUI element difference entries, discussed further below. In one implementation, the script analyzer 170 uses a GUI class rules logic to further the analysis, discussed in further detail below. The script analyzer 170 outputs a transformed test script 178, a change guide 180 and GAP change specifiers 184 based on analysis performed on the GUI difference model 162 and AST 168.

FIG. 2 shows a GUI of a current GAP version 150. Table 1 shows a current GAP tree model representation of the GUI of the current GAP version 150. The current GAP tree model shown in Table 1 specifies the GUI elements and attributes of the GUI elements of the current GAP version 150. Table 1 illustrates that the current GAP tree model supports GUI elements that include nested GUI elements. For example, StateList window 202, shown in FIG. 2, corresponds to GUI Element Alias StateList at line 11 (L11) of Table 1 and nested GUI elements SaveFile, Exit, SaveChange, FileOpen, the listbox School, shown at lines 18-21 and 59 of Table 1, correspond, respectively, to Save File 204, Close Form 206, Save Change 208, Open File 210 and the listbox School 216 of FIG. 2. In one implementation, the GUI difference model 162 results from a comparison of the current GAP tree model as shown in Table 1 and a subsequent GAP tree model illustrated below in Table 3.

A GAP, the GUI elements of the GAP and the values of the GUI elements define states for the GAP. The current and subsequent GAP tree models capture the states of the current and subsequent GAP versions (e.g., 150 and 152), respectively. In one implementation, GAP states are identified by sequent numbers and alias, as well as other attributes. For example, line 1 of Table 1 illustrates a 'state' that has a SeqNumber with a value of 0. The SeqNumber represents a unique sequence number of the current GAP version. The state is given the name State_0_3556. The attributes Alias and Processid represent the alias of the current GAP version 150 and the instance process identifier for the current GAP version 150, respectively. Recall that Table 1 and Table 3 illustrate that the current and subsequent GAP tree models support GUI elements that include nested GUI elements. Although multiple GUI elements may use an identical Alias (e.g., StateList as illustrated in Table 1 at lines 2 and 11) the GUI elements are further distinguished by the UniqueID attribute (e.g., 0x0 and 0x12 as shown at lines 3 and 12 of Table 1).

TABLE 1

Current GAP tree model

```
- <State SeqNumber="0" Name="State_0_3556" Alias="University
Directory0" ProcessId="3556">
   - <GUIElement Alias="StateList">
        <UniqueID>0x0</UniqueID>
        <HWND>0x170a64</HWND>
        <Location x="87" y="66" width="792" height="672" />
        <Class>WindowsForms10.Window.8.app4</Class>
        <Style>0x16cf0000</Style>
        <ExStyle>0xc0050900</ExStyle>
     + <GUIElement Alias="System">
     + <GUIElement Alias="NAMELESS">
L11 - <GUIElement Alias="StateList">
        <UniqueID>0x12</UniqueID> fs
        <HWND>0x170a64</HWND>
        <Location x="117" y="70" width="784" height="638" />
        <Class>WindowsForms10.Window.8.app4</Class>
        <Style>0x16cf0000</Style>
        <ExStyle>0xc0050900</ExStyle>
L18 + <GUIElement Alias="SaveFile">
L19 + <GUIElement Alias="Exit">
L20 + <GUIElement Alias="SaveChange">
L21 + <GUIElement Alias="FileOpen">
     + <GUIElement Alias="Location">
     + <GUIElement Alias="AcademicEmph">
     + <GUIElement Alias="QolScale">
     + <GUIElement Alias="SocialScale">
     + <GUIElement Alias="AcadScale">
     + <GUIElement Alias="EnrolledPerc">
     + <GUIElement Alias="AdmittancePerc">
     + <GUIElement Alias="NumApps">
     + <GUIElement Alias="FinancialAid">
     + <GUIElement Alias="Expense">
```

TABLE 1-continued

Current GAP tree model

```
     + <GUIElement Alias="SATMath">
     + <GUIElement Alias="SATVerbal">
     + <GUIElement Alias="SFRatio">
     + <GUIElement Alias="MFRatio">
     + <GUIElement Alias="NumStudents">
     + <GUIElement Alias="Control">
     + <GUIElement Alias="State">
     + <GUIElement Alias="School">
     + <GUIElement Alias="Location">
     + <GUIElement Alias="Academic Emphasis">
     + <GUIElement Alias="Quality of Life Scale (1-5)">
     + <GUIElement Alias="Social Scale (1-5)">
     + <GUIElement Alias="Academics Scale (1-5)">
     + <GUIElement Alias="Enrolled %">
     + <GUIElement Alias="Admittance %">
     + <GUIElement Alias="# Applicants (1000)">
     + <GUIElement Alias="Financial Aid %">
     + <GUIElement Alias="Expenses (1000$)">
     + <GUIElement Alias="SAT:math">
     + <GUIElement Alias="Student/Faculty Ratio">
     + <GUIElement Alias="SAT:verbal">
     + <GUIElement Alias="Male/Female Ratio">
     + <GUIElement Alias="Number of Students (1000)">
     + <GUIElement Alias="Control">
     + <GUIElement Alias="State">
     + <GUIElement Alias="SelectSchoolBtn">
     + <GUIElement Alias="School List">
L59 + <GUIElement Alias="SchoolListbox">
     + <GUIElement Alias="SelectStateBtn">
     + <GUIElement Alias="State List">
L62 + <GUIElement Alias="StateListbox">
     </GUIElement>
   </GUIElement>
</State>
```

The StateListBox GUI element shown in Table 1 at line 62 corresponds to the State listbox 212 shown in FIG. 2. FIG. 2 shows a horizontal navigation bar 214 as a feature of the State listbox 212. Table 2 shows some of the attributes of State listbox 212 that may be reflected in the GUI difference model 162 as a result of a comparison between the current GAP tree model and the subsequent GAP tree model shown in Table 3.

TABLE 2

Current GAP StateListbox GUI element schema

```
   - <GUIElement Alias="StateListbox">
        <UniqueID>0x407</UniqueID>
        <HWND>0x90b58</HWND>
        <Location x="173" y="86" width="368" height="274" />
        <Class>WindowsForms10.LISTBOX.app4</Class>
        <Style>0x56110ac1</Style>
       <ExStyle>0xc0000a00</ExStyle>
   - <GUIElement Alias="StateListbox">
        <UniqueID>0x410</UniqueID>
        <HWND>0x90b58</HWND>
        <Location x="175" y="88" width="364" height="253" />
        <Class>WindowsForms10.LISTBOX.app4</Class>
        <Style>0x56110ac1</Style>
        <ExStyle>0xc0000a00</ExStyle>
     - <Values>
        <Value SeqNumber="0">Alabama</Value>
        <Value SeqNumber="1">Alaska</Value>
        <Value SeqNumber="2">Arizona</Value>
        <Value SeqNumber="3">Arkansas</Value>
        <Value SeqNumber="4">California</Value>
        <Value SeqNumber="5">Colorado</Value>
        <Value SeqNumber="6">Connecticut</Value>
        <Value SeqNumber="7">Delaware</Value>
        <Value SeqNumber="8">District of Columbia</Value>
        <Value SeqNumber="9">Florida</Value>
        <Value SeqNumber="10">Georgia</Value>
        <Value SeqNumber="11">Hawaii</Value>
        <Value SeqNumber="12">Idaho</Value>
```

TABLE 2-continued

Current GAP StateListbox GUI element schema

```
            <Value SeqNumber="13">Illinois</Value>
            <Value SeqNumber="14">Indiana</Value>
            <Value SeqNumber="15">Iowa</Value>
            <Value SeqNumber="16">Kansas</Value>
            <Value SeqNumber="17">Kentucky</Value>
            <Value SeqNumber="18">Louisiana</Value>
            <Value SeqNumber="19">Maine</Value>
            <Value SeqNumber="20">Maryland</Value>
            <Value SeqNumber="21">Massachusetts</Value>
            <Value SeqNumber="22">Michigan</Value>
            <Value SeqNumber="23">Minnesota</Value>
            <Value SeqNumber="24">Mississippi</Value>
            <Value SeqNumber="25">Missouri</Value>
            <Value SeqNumber="26">Montana</Value>
            <Value SeqNumber="27">Nebraska</Value>
            <Value SeqNumber="28">Nevada</Value>
            <Value SeqNumber="29">New Hampshire</Value>
            <Value SeqNumber="30">New Jersey</Value>
            <Value SeqNumber="31">New Mexico</Value>
            <Value SeqNumber="32">New York</Value>
            <Value SeqNumber="33">North Carolina</Value>
            <Value SeqNumber="34">North Dakota</Value>
            <Value SeqNumber="35">Ohio</Value>
            <Value SeqNumber="36">Oklahoma</Value>
            <Value SeqNumber="37">Oregon</Value>
            <Value SeqNumber="38">Pennsylvania</Value>
            <Value SeqNumber="39">Rhode Island</Value>
            <Value SeqNumber="40">South Carolina</Value>
            <Value SeqNumber="41">South Dakota</Value>
            <Value SeqNumber="42">Tennessee</Value>
            <Value SeqNumber="43">Texas</Value>
            <Value SeqNumber="44">Utah</Value>
            <Value SeqNumber="45">Vermont</Value>
            <Value SeqNumber="46">Virginia</Value>
            <Value SeqNumber="47">Washington</Value>
            <Value SeqNumber="48">West Virginia</Value>
            <Value SeqNumber="49">Wisconsin</Value>
            <Value SeqNumber="50">Wyoming</Value>
        </Values>
    </GUIElement>
    + <GUIElement Alias="Horizontal">
</GUIElement>
```

FIG. 3 shows the GUI of a subsequent GAP version 152. Table 3 illustrates a subsequent GAP tree model representation of the subsequent GAP version 152. The subsequent GAP tree model shown in Table 3 includes the GUI elements and the attributes of the GUI elements. For example, the window GUI object School 302 shown in FIG. 3 corresponds to GUI Element Alias "School" shown at line 11 (L11) of Table 3 and nested GUI elements StateListBox and SchoolCombobox shown at lines 23 and 24 of Table 3 correspond, respectively, to State listbox 304 and School combobox 306 of FIG. 3. In one implementation, the GUI difference model 162 results from a comparison between the current GAP tree model as shown in Table 1 and a subsequent GAP tree model as shown in Table 3.

TABLE 3

Subsequent GAP tree model

```
- <State SeqNumber="0" Name="State_0_3068" Alias="University
Directory1" ProcessId="3068">
    - <GUIElement Alias="School">
        <UniqueID>0x0</UniqueID>
        <HWND>0x80b8</HWND>
        <Location x="116" y="88" width="915" height="594" />
        <Class>WindowsForms10.Window.8.app.0.378734a</Class>
        <Style>0x16cf0000</Style>
        <ExStyle>0xc0050900</ExStyle>
    + <GUIElement Alias="System">
    + <GUIElement Alias="NAMELESS">
```

TABLE 3-continued

Subsequent GAP tree model

```
L11 - <GUIElement Alias="School">
        <UniqueID>0x12</UniqueID>
        <HWND>0x80b8</HWND>
        <Location x="146" y="92" width="907" height="560" />
        <Class>WindowsForms10.Window.8.app.0.378734a</Class>
        <Style>0x16cf0000</Style>
        <ExStyle>0xc0050900</ExStyle>
L18   + <GUIElement Alias="menuStrip1">
      + <GUIElement Alias="States List">
      + <GUIElement Alias="School List">
      + <GUIElement Alias="SelectStateIButton">
      + <GUIElement Alias="SelectSchoolButton">
L23   + <GUIElement Alias="StateListbox">
L24   + <GUIElement Alias="SchoolCombobox">
      + <GUIElement Alias="School">
      + <GUIElement Alias="state">
      + <GUIElement Alias="State">
      + <GUIElement Alias="location">
      + <GUIElement Alias="Location">
      + <GUIElement Alias="control">
      + <GUIElement Alias="Control">
      + <GUIElement Alias="Number of Students (1000)">
      + <GUIElement Alias="NumStudents">
      + <GUIElement Alias="Male/Female Ratio">
      + <GUIElement Alias="GenderRatio">
      + <GUIElement Alias="Student/Faculty Ratio">
      + <GUIElement Alias="SFRatio">
      + <GUIElement Alias="SAT Verbal">
      + <GUIElement Alias="SATVerbal">
      + <GUIElement Alias="SAT Math">
      + <GUIElement Alias="SATMath">
      + <GUIElement Alias="Number of Applicants">
      + <GUIElement Alias="NumApps">
      + <GUIElement Alias="Percent of Admittance">
      + <GUIElement Alias="PercAdmit">
      + <GUIElement Alias="Percent Enrolled">
      + <GUIElement Alias="Percent Enrolled">
      + <GUIElement Alias="Academics (1-5)">
      + <GUIElement Alias="Academics">
      + <GUIElement Alias="Social (1-5)">
      + <GUIElement Alias="Social">
      + <GUIElement Alias="Quality of Life (1-5)">
      + <GUIElement Alias="QoLife">
      + <GUIElement Alias="Academic Emphasis">
      + <GUIElement Alias="AcadEmphasis">
      + <GUIElement Alias="Expenses">
      + <GUIElement Alias="Expense">
      + <GUIElement Alias="Financial Aid">
      + <GUIElement Alias="FinancialAid">
    </GUIElement>
  </GUIElement>
</State>
```

The subsequent GAP menuStrip1 GUI element schema shown in Table 3 at line 18 corresponds to the WinObject GUI object 'menu strip' 308 shown in FIG. 3. The subsequent GAP menuStrip1 GUI element schema shown in Table 4 illustrates the full entry at line 18 in Table 3 and indicates that the menu strip 308 includes a nested GUI element File menu that includes nest GUI elements OpenFile, SaveFile, SaveAs, and Exit, shown at lines 15 of Table 4, and 22-25, respectively.

TABLE 4

Subsequent GAP menuStrip1 GUI element schema

```
- <GUIElement Alias="menuStrip1">
    <UniqueID>0x13</UniqueID>
    <HWND>0xa0e62</HWND>
    <Location x="146" y="92" width="907" height="24" />
    <Class>WindowsForms10.Window.8.app.0.378734a</Class>
    <Style>0x56000000</Style>
    <ExStyle>0xc0010800</ExStyle>
    - <GUIElement Alias="menuStrip1">
```

TABLE 4-continued

Subsequent GAP menuStrip1 GUI element schema

```
        <UniqueID>0x1c</UniqueID>
        <HWND>0xa0e62</HWND>
        <Location x="146" y="92" width="907" height="24" />
        <Class>WindowsForms10.Window.8.app.0.378734a</Class>
        <Style>0x56000000</Style>
        <ExStyle>0xc0010800</ExStyle>
L15     - <GUIElement Alias="FileMenu">
           <UniqueID>0x1d</UniqueID>
           <HWND>0xa0e62</HWND>
           <Location x="148" y="98" width="35" height="20" />
           <Class>WindowsForms10.Window.8.app.0.378734a</Class>
           <Style>0x56000000</Style>
           <ExStyle>0xc0010800</ExStyle>
L22        + <GUIElement Alias="OpenFile">
L23        + <GUIElement Alias="SaveFile">
L24        + <GUIElement Alias="SaveAsFile">
L25        + <GUIElement Alias="Exit">
        </GUIElement>
    </GUIElement>
</GUIElement>
```

Figure 4:
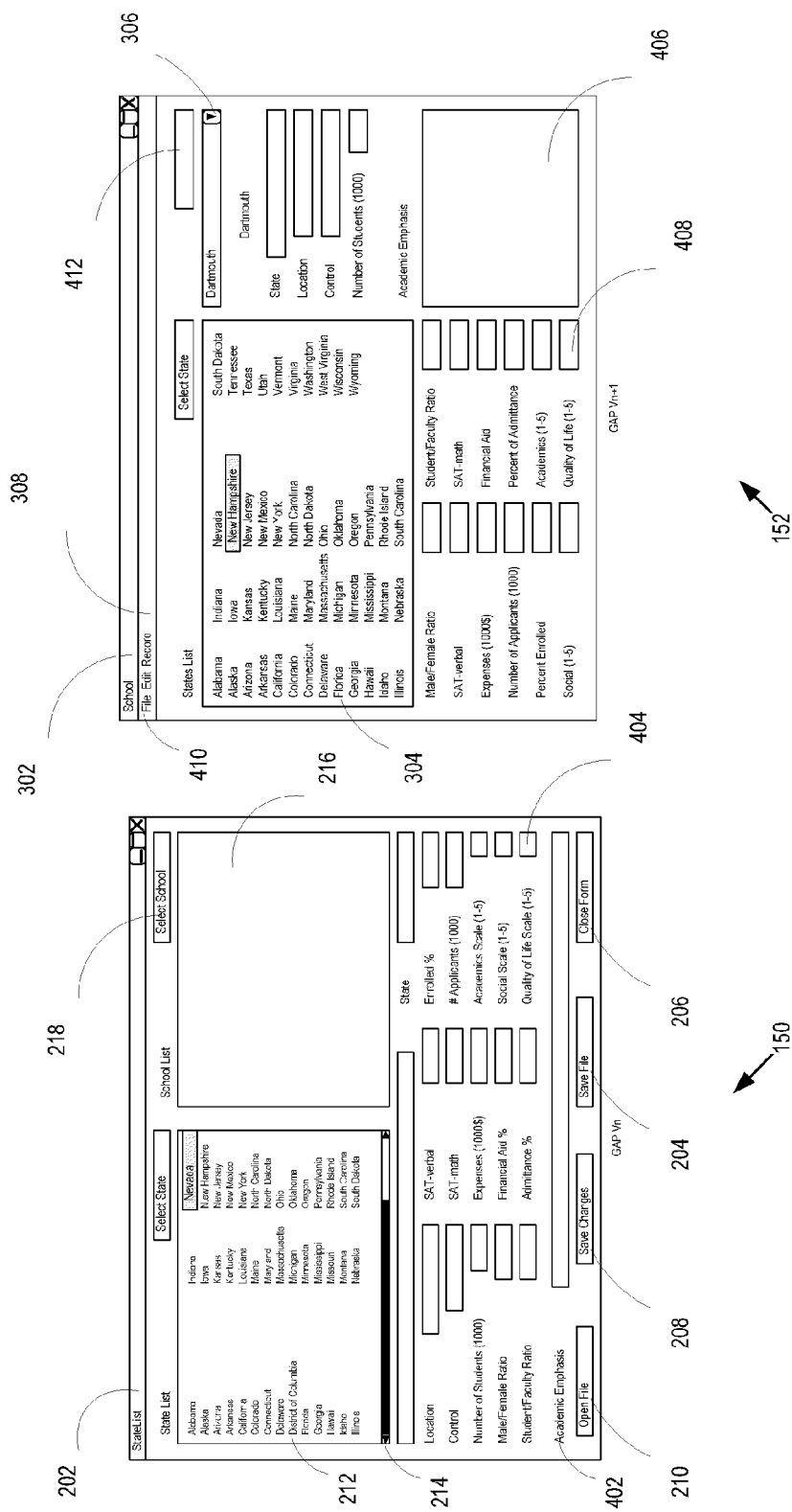
FIG. 4 illustrates a current and a subsequent GAP comparison.

FIG. 4 illustrates a side by side view 400 of the current and subsequent GAP that helps illustrate GUI element similarities, as well as differences, between successive GAP versions. In the view 400, there are several GUI objects that have the same desired functionality between successive GAP versions, although aspects of the GUI object may appear different between successive GAP versions.

For example, referring to FIG. 4, differences between the current GAP version 150 and subsequent GAP version 152 include that the window StateList 202, listbox State 212, field Academic Emphasis 402, and field Quality of Life Scale (1-5) 404 in the current GAP version 150 are respectively represented by window School 302, listbox State 304, field Academic Emphasis 406, and field Quality of Life (1-5) 408 in the subsequent GAP version 152. In another example, consider the Save File 204, Close Form 206, Save Change 208 and Open File 210 GUI objects implemented in the current GAP version 150 that have been implemented in the subsequent GAP version 152 as child GUI objects of the File 410, which is a child GUI object of the menu strip 308 GUI object.

It can be challenging to locate differences between GUI elements of GAPs. For example, it is not readily evident that the listbox School 216 and the combobox School 306 are meant to have the same or similar functionality between successive GAP versions. As another example, the WinObject "Select School" 218 in the current GAP version 150 has been removed at location 412 from the subsequent GAP version 152. The GUI difference model 162 include GUI element difference entries that list characteristics of GUI elements, for those GUI elements that match between the current GAP version and the subsequent GAP version, but that differ in character between the current GAP version and the subsequent GAP version. The GUI element difference entries will guide the script analysis as described in more detail below.

FIG. 5 shows an exemplary GUI element different entry 504. FIG. 5 illustrates a GUI difference model 162 obtained by comparing a current GAP tree model as shown in Table 1 and a subsequent GAP tree model as shown in Table 3. In one implementation, the GUI difference model 162 is implemented as an XML schema that specifies each GUI element difference between successive GAP versions with a corresponding GUI element difference entry. In another implementation, the GUI difference model 162 nests GUI element difference entries to indicate parent and child GUI elements, and the level at which a GUI element difference entry is nested indicates how far the corresponding GUI element is away from a parent GUI element (root) in a navigation path.

In one implementation, the GUI difference model 162 omits a GUI element difference entry for GUI objects that have been deleted between successive GAP versions. Each GUI element difference entry representing a GUI object that has been modified or added between successive GAP versions includes a tag 'Version' that has a value of, as examples, either 0 or 1. In other words, a GUI element difference entry that does not include a Version tag indicates that the GUI object has not been modified between successive GAP versions. The Version values of 0 and 1 indicate whether the children elements of the Version represent the properties of the GUI object in the current GAP version 150 or the subsequent GAP version 152, respectively. For example, the GUI difference entry 504 shown in FIG. 5 indicates at line 11 that the listbox StateListbox value for SeqNumber ="8" implemented in the current GAP version 150 is "District of Columbia", while the value in the subsequent GAP version 152 is "Florida" as indicated at line 23. In one implementation, the GUI difference entry 504 includes a ParentChildIdentifier element at line 3 that identifies the relationship between two GUI objects in a given GAP version, so that GUI class and inheritance constraints can be validated (discussed in detail further below).

Figure 14:
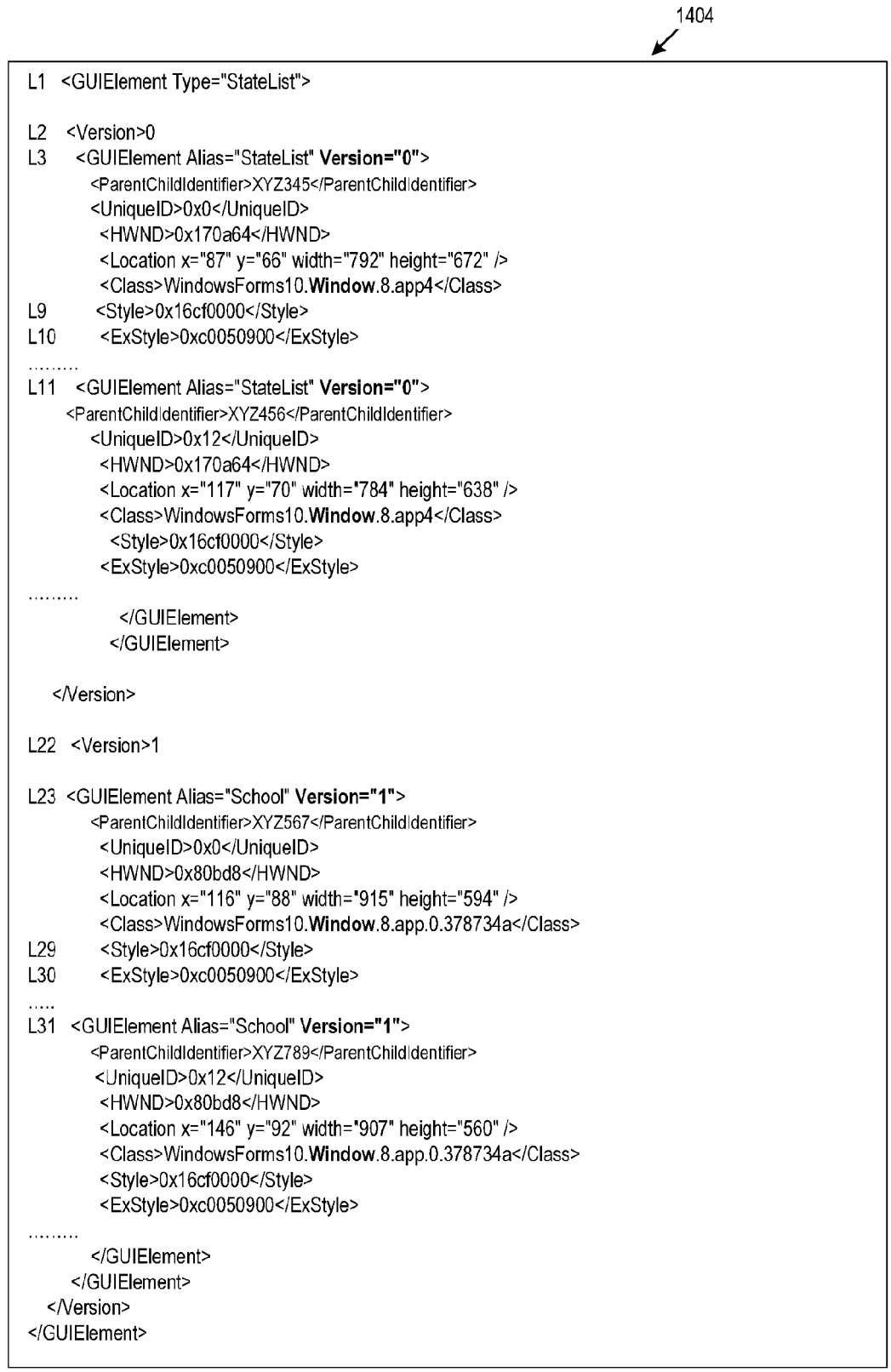
FIG. 14 illustrates another GUI element difference entry.

Referring briefly to FIG. 14, the GUI difference entry 1404 indicates at line 1 that the window StateList in the current GAP version 150 corresponds to the window School in the subsequent GAP version 152 indicated at line 22 by the Version value equal to 0 and 1, respectively. The StateList and School GUI objects are of the WindowsForm10.Window.8 class, as shown at lines 8 and 28. The sub-class identifier for the StateList and School GUI object distinguish the GUI objects (e.g., app4 and app.0.0378734a, respectively). The GUI difference entry 1404 indicates that the Location element of the StateList and School windows are different, as shown at lines 7 and 27, respectively. However, the GUI difference entry 1404 also indicates that the Style and ExStyle elements are identical, as shown at lines 9-10 and 29-30, respectively.

Referring briefly to FIG. 15, the GUI difference entry 1504 indicates at line 3 that the listbox SchoolListbox in the current GAP version 150 corresponds to the combobox SchoolCombobox in the subsequent GAP version 152 indicated at line 13. The GUI difference entry 1504 indicates that the Location element of the SchoolListbox and SchoolCombobox are different, as shown at lines 7 and 18, respectively. The GUI difference entry 1504 also indicates that the Class, Style and ExStyle elements are different, as shown at lines 8-10 and 19-21, respectively. In particular, one or more of the properties of a WindowsForms10.LISTBOX and a WindowsForms10.COMBOBOX are different, incompatible with the properties of the other class, and child GUI elements of GUI objects of these two classes may have one or more incompatible properties.

FIG. 6 shows a current test script 164 for the current GAP. The current test script 164 includes navigation statements (e.g., L1 and L6) that navigate to GUI objects, perform read, write, or other actions (functions) on GUI objects, and the arguments of these functions. For example, line 1 of the current test script 164 navigates to a window StateList, locates 'Open File' identified as a child GUI object of the window StateList, and performs an action 'Click' on the 'Open File' GUI object at XY coordinates 86, 12. Through the series of navigation and action statements, the current test script 164 opens a file 'university.data' as indicated by lines 2-3. The current test script 164 selects a school 'Acme State University' as a result of the navigation and action statements at lines 4-7 based on the coordinates 67, 12 in WinObject "Select School". The current test script 164 changes the academic scale to '3' as a result of the statements at lines 8-10, and saves the change to a new file 'university_revise.data' as a result of the statements at lines 11-14.

Figure 7:
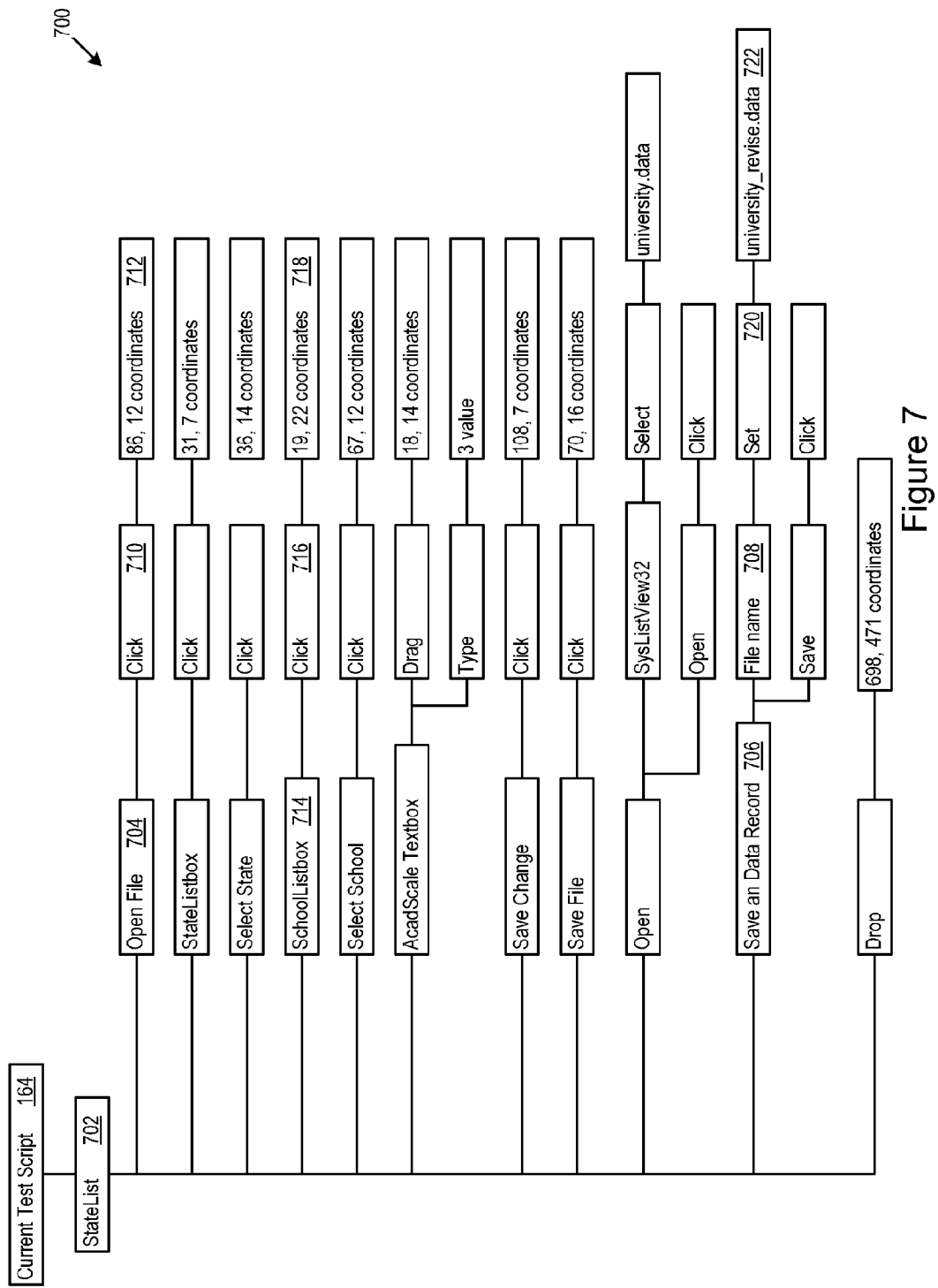
FIG. 7 shows a current test script representation.

FIG. 7 illustrates a current test script representation 700 that the script parser 166 produces as an intermediate representation of the current test script 164. In one implementation, the SAA 108 implements the current test script representation as an abstract syntax tree (AST) 168. The current test script representation 700 represents a vector (e.g., the current test script 164) whose elements are vectors that represent navigation statements of the current test script 164. In other words, the current test script representation 700 represents the navigation statements as test script statement vectors that navigate to GUI objects and perform actions on those GUI objects. Table 5 illustrates a grammar the script parser 166 may use to produce the current test script representation 700. The terminals func, action and var represent the names of platform-specific functions that navigate to GUI objects (e.g., Window, VbEdit, and WinObject), perform read, write, or other actions (functions) on GUI objects, and the arguments of these functions, respectively.

TABLE 5

Script Parser Grammar navstmt ::= func(arg) | navstmt . Navstmt | navstmt action arg
fullnavstmt ::= var = navstmt | navstmt action arg
arg ::= expr | "," arg |

The script parser 166 represents the test script statement vectors as an ordered sequence of nodes that contain function names and the arguments of those functions that navigate to GUI objects. The nodes of a test script statement vector include a source node and a destination. For example, the script parser 166 may represent the test script statement vector corresponding to line 1 of the current test script 164 as source node StateList 702 and a destination node 'Open File' 704. The nodes of a test script statement vector may also include intermediate nodes positioned between a source node and a destination node. For example, the script parser 166 may represent the test script statement vector corresponding to line 13 of the current test script 164 as source node StateList 702, intermediate node 'Save a Data Record' 706 and destination node 'File name' 708. In one implementation, the script analyzer 170 uses the test script statement vectors to analyze plausible navigation paths to GUI objects identified in the GUI difference model 162 by GUI element difference entries, described in further detail below. The script analyzer 170 may use the test script statement vectors to also analyze plausible GUI objects identified in the object repository 174, also discussed in further detail below.

The script parser 166 evaluates arguments of navigation and action functions as expressions, variables and constants. The arguments express the physical properties of GUI objects to which the test script statement vectors navigate and values used to perform actions on those GUI objects. For example, the '86,12' coordinates 712 identify the location for a pointing device to perform an action 'Click' 710 on the 'Open File' 704 GUI object, which is a child GUI Object of the window StateList 702. The script analyzer 170 uses the names of the GUI objects (e.g., StateList 702 and 'Open File' 704) navigated to by the test script statement vectors to locate the corresponding physical properties of the GUI objects stored in an Object Repository (OR) 174.

In one implementation, the script analyzer 170 uses the OR Lookup logic 172 to return from the object repository 174 the physical properties of the GUI objects navigated to by a test script statement vector. In one implementation, the OR Lookup logic 172 is divided into two sub-functions: 1) lookup logic adapted to locate and retrieve the physical properties of the GUI objects navigated to by the test script statement vector (e.g., 702-704, 702-706-708, and 702-714); and 2) locator logic that finds and returns a GUI element difference entry (node) in the GUI difference model 162 that corresponds to the GUI object with the given physical properties. The OR Lookup logic 172 may include path traversal logic, discussed in further detail below, to identify possible navigation paths of the test script statement vector between a source node GUI object and destination node GUI object to which a test script statement vector navigates.

Table 6 illustrates one implementation of an object repository 174, in the form of an XML schema. The object repository 174 includes a GUI object entry for each GUI Object of the current GAP version 150 identified in the current test script 164. The object repository 174 may be generated by a script writing tool, such as Quick Test Pro (QTP), Rational Robot, and Compuware Test Partner. The script analyzer 170 may query the object repository 174 to identify the physical properties of the GUI objects navigated to by the test script statement vectors represented by the current test script representation 700. Physical properties of a GUI object may indicate whether the GUI object is hidden, read-only, a number and default values, as shown in Table 7.

For example, the script analyzer 170 analyzes the GUI objects 702-714 in the test script statement vector. The '19, 22' coordinate 718 identifies the location for a pointing device to perform an action 'Click' 712 on the GUI object SchoolListbox 714, which is a child GUI Object of the window StateList 702. The script analyzer 170 Invokes the OR Lookup logic 172 to locate the physical properties of the GUI objects 702 and 714. The OR Lookup logic 172 locates the physical properties of the window StateList 702 and the WinObject SchoolListbox 714, as shown in Table 6 at lines 3 and 12. The script analyzer 170 uses the physical properties retrieved from the object repository 174 to locate corresponding GUI difference entries (e.g., 1404 and 1504) in the GUI difference model 162. The GUI difference entries 1404 and 1504 indicate that the window StateList 702 and the WinObject SchoolListbox 714 in the current GAP version 150 correspond to the window School 302 and the WinObject SchoolCombobox 306 in the subsequent GAP version 152, respectively. In one implementation, the script analyzer 170 employs the OR Lookup logic 172 to traverse the GUI difference model 162 using the physical properties of the GUI objects navigated to by the test script statement vector. The OR Lookup 172 function returns a GUI element difference entry (e.g., 504, 1404 and 1504) from the GUI difference model 162 that represents the GUI object navigated to by the test script statement vector (e.g., 702-704-710-712, 702-706-708-720-722, and 702-714-726-718).

TABLE 6

Object Repository

- <XYZRep:ObjectRepository
    xmlns:XYZRep="http://www.vendorXYZ.com/XYZ/
    ObjectRepository">
- <XYZRep:Objects>

TABLE 6-continued

Object Repository

L3 – <XYZRep:Object Class="Window" Name="StateList">
+ <XYZRep:Properties>
+ <XYZRep:BasicIdentification>
+ <XYZRep:CustomReplay>
L7 – <XYZRep:ChildObjects>
    + <XYZRep:Object Class="WinObject" Name="Open File">
    + <XYZRep:Object Class="WinObject" Name="StateListbox">
    + <XYZRep:Object Class="WinObject" Name="Select State">
    + <XYZRep:Object Class="WinObject" Name="Select School">
    + <XYZRep:Object Class="WinObject" Name="SchoolListbox">

TABLE 6-continued

Object Repository

</XYZRep:ChildObjects>
  </XYZRep:Object>
  </XYZRep:Objects>
  <XYZRep:Parameters />
  <XYZRep:Metadata />
</XYZRep:ObjectRepository>

Table 7 illustrates the physical properties that may be located in the object repository for the GUI object entry corresponding to the SchoolListbox 714.

TABLE 7

GUI object entry WinObject ("SchoolListbox")

- <XYZRep:Object Class="WinObject" Name="SchoolListbox">
L2 – <XYZRep:Properties>
  – <XYZRep:Property Name="y" Hidden="0" ReadOnly="0" Type="NUMBER">
    <XYZRep:Value RegularExpression="0">86</XYZRep:Value>
    </XYZRep:Property>
  – <XYZRep:Property Name="x" Hidden="0" ReadOnly="0" Type="NUMBER">
    <XYZRep:Value RegularExpression="0">420</XYZRep:Value>
    </XYZRep:Property>
  – <XYZRep:Property Name="windowstyle" Hidden="0" ReadOnly="0" Type="NUMBER">
    <XYZRep:Value RegularExpression="0">1442906305</XYZRep:Value>
    </XYZRep:Property>
  – <XYZRep:Property Name="windowextendedstyle" Hidden="0" ReadOnly="0" Type="NUMBER">
    <XYZRep:Value RegularExpression="0">512</XYZRep:Value>
    </XYZRep:Property>
  – <XYZRep:Property Name="window id" Hidden="0" ReadOnly="0" Type="NUMBER">
    <XYZRep:Value RegularExpression="0">1182924</XYZRep:Value>
    </XYZRep:Property>
  – <XYZRep:Property Name="width" Hidden="0" ReadOnly="0" Type="NUMBER">
    <XYZRep:Value RegularExpression="0">336</XYZRep:Value>
    </XYZRep:Property>
  – <XYZRep:Property Name="visible" Hidden="0" ReadOnly="0" Type="BOOL">
    <XYZRep:Value RegularExpression="0">–1</XYZRep:Value>
    </XYZRep:Property>
  – <XYZRep:Property Name="regexpwndclass" Hidden="0" ReadOnly="0" Type="STRING">
    <XYZRep:Value RegularExpression="0">WindowsForms10.LISTBOX.app4</XYZRep:Value>
    </XYZRep:Property>
  – <XYZRep:Property Name="object class" Hidden="0" ReadOnly="0" Type="STRING">
    <XYZRep:Value RegularExpression="0">WindowsForms10.LISTBOX.app4</XYZRep:Value>
    </XYZRep:Property>
  – <XYZRep:Property Name="nativeclass" Hidden="0" ReadOnly="0" Type="STRING">
    <XYZRep:Value RegularExpression="0">WindowsForms10.LISTBOX.app4</XYZRep:Value>
    </XYZRep:Property>
  – <XYZRep:Property Name="height" Hidden="0" ReadOnly="0" Type="NUMBER">
    <XYZRep:Value RegularExpression="0">260</XYZRep:Value>
    </XYZRep:Property>
  – <XYZRep:Property Name="enabled" Hidden="0" ReadOnly="0" Type="BOOL">
    <XYZRep:Value RegularExpression="0">–1</XYZRep:Value>
    </XYZRep:Property>
L39  </XYZRep:Properties>
  – <XYZRep:BasicIdentification>
    <XYZRep:PropertyRef>y</XYZRep:PropertyRef>
    <XYZRep:PropertyRef>x</XYZRep:PropertyRef>
    <XYZRep:PropertyRef>windowstyle</XYZRep:PropertyRef>
    <XYZRep:PropertyRef>windowextendedstyle</XYZRep:PropertyRef>
    <XYZRep:PropertyRef>width</XYZRep:PropertyRef>
    <XYZRep:PropertyRef>visible</XYZRep:PropertyRef>
    <XYZRep:PropertyRef>regexpwndclass</XYZRep:PropertyRef>
    <XYZRep:PropertyRef>object class</XYZRep:PropertyRef>
    <XYZRep:PropertyRef>nativeclass</XYZRep:PropertyRef>
    <XYZRep:PropertyRef>height</XYZRep:PropertyRef>
    <XYZRep:PropertyRef>enabled</XYZRep:PropertyRef>
  </XYZRep:BasicIdentification>
– <XYZRep:CustomReplay>

TABLE 7-continued

GUI object entry WinObject ("SchoolListbox")

```
<XYZRep:Behavior Name="simclass"
        Type="STRING">WindowsForms10.LISTBOX.app4</XYZRep:Behavior>
    </XYZRep:CustomReplay>
- <XYZRep:Comments>
    <XYZRep:Comment Name="miccommentproperty" />
    </XYZRep:Comments>
    <XYZRep:ChildObjects />
    </XYZRep:Object>
```

Figure 8:
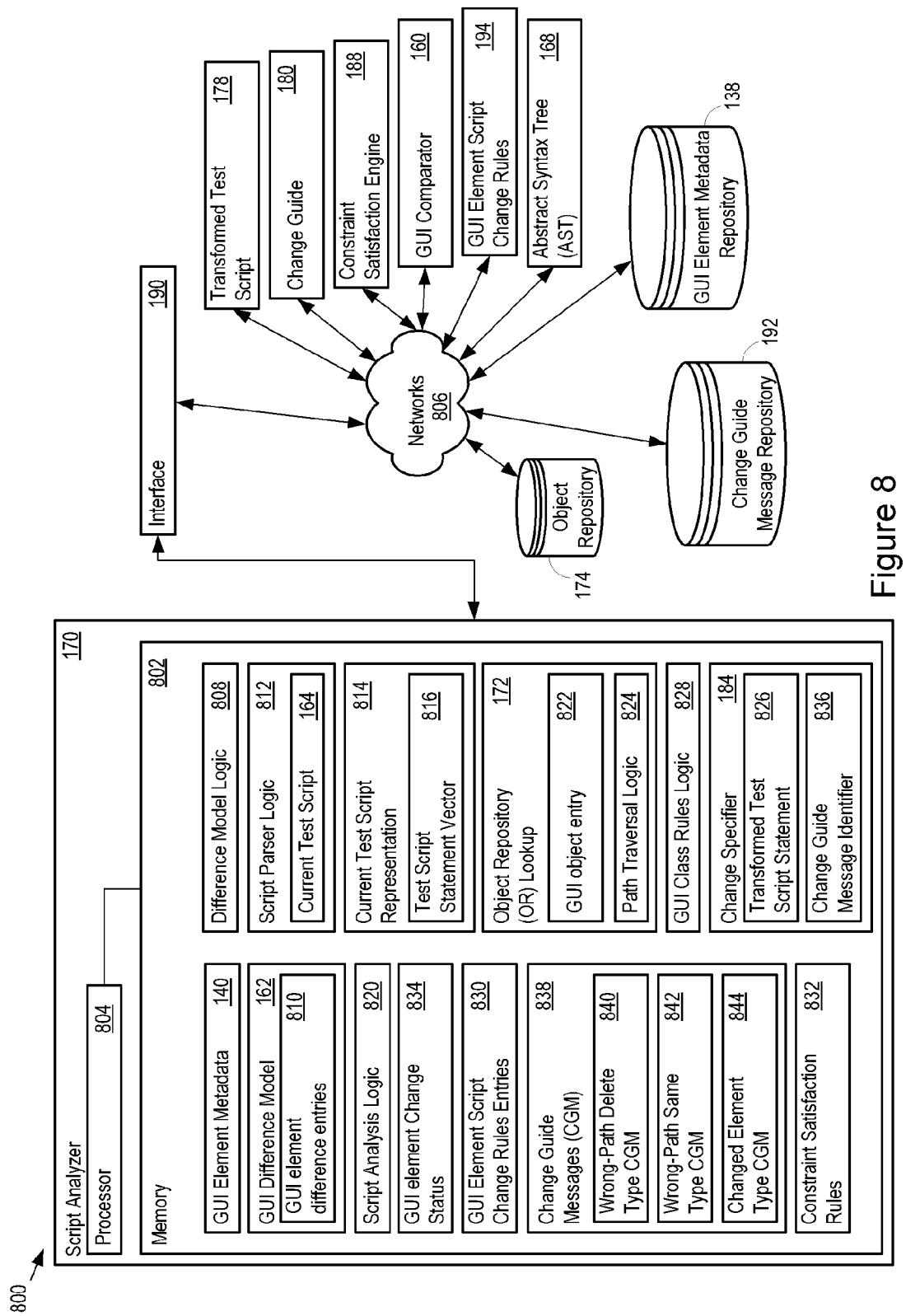
FIG. 8 shows an example script analyzer system.

FIG. 8 shows an example script analyzer system (SAS) 800 that may implement the script analyzer 170. The SAS 800 includes a memory 802 coupled to a processor 804, and an interface 190. In one implementation, the interface 190 communicates with the GUI element metadata repository 138 and a GUI comparator 160 to receive GUI element metadata 140 and the GUI difference model 162, respectively. The interface 190 is connected to a network 806 (e.g., the Internet) in communication with various other systems and resources. In another implementation, the memory 802 includes the GUI element metadata 140, and GUI difference model logic 808 that produces the GUI difference model 162 and the GUI element difference entries 810. The memory 802 also includes script parser logic 812 that receives the current test script 164 and produces the AST 168, processes the AST 168 as a current test script representation 814, and produces the test script statement vectors 816 (e.g., 702-704-710-712, 702-706-708-720-722, and 702-714-726-718).

The memory 802 further includes script analysis logic 820 that receives the GUI difference model 162, and the current test script representation 814 for the current test script 164, including a test script statement vector 816. In one implementation, the script analysis logic 820 invokes the OR Lookup logic 172 to locate, in the object repository 174, a GUI object entry 822 matching the test script statement vector 816. In one implementation, the script analyzer 170 invokes the OR Lookup logic 172 to locate, in various external sources, a GUI object entry 822 matching the test script statement vector 816. When the test script statement vector 816 (e.g., 702-704-710-712, 702-706-708-720-722, and 702-714-726-718) employs constants to identify GUI object names, rather than expressions whose values can only be determined at runtime, the OR Lookup 172 function may use the GUI object name and properties of the GUI object to efficiently locate the correct GUI object entry 822 and locate, in the GUI difference model 162, a GUI element difference entry 810 matching the GUI object entry 822.

For example, the test script statement vector represented by 702-704-710-712 identifies the window GUI object StateList 202 and the listbox GUI object SchoolListbox 216, shown in the current test script 164 navigation statement shown at line 6 of FIG. 6:

Window("StateList").WinObject("SchoolListbox")
.Click 19,22.

The OR Lookup 172 function locates the GUI object entry 822 for each GUI object 202 and 216, using the known names of the GUI objects, StateList and SchoolListbox, respectively. The OR Lookup 172 function locates the corresponding GUI element difference entries 1404 and 1504, in the GUI difference model 162. The script analysis logic 820 outputs a transformed test script statement 826 that corresponds to 302 and 306:

Window("School").WinObject("SchoolCombobox")
.Click 294,14.

The GUI class rule logic 828 may use the GUI object names to locate the properties used to validate that the transformed test script statement 828 does not violate GUI element script change rules 194 and constraints. In one implementation, the script analyzer 170 uses the GUI class rules logic 828 in conjunction with the constraint satisfaction engine 188 to determine violations of GUI element script change rules 194 and constraints.

For example, when the transformed test script statement 826 accesses GUI objects that do not exist in the subsequent GAP version 152, and/or the transformed test script statement 826 attempts to set a value of a GUI object that is not compatible with the GUI class of that GUI object, then the transformed test script statement 826 violates constraints imposed on the GUI object. The constraint satisfaction engine 188 validates the transformed test script statement 826 to help verify that incorrect operations will be identified in the transformed test script statement 826 for a programmer to resolve. In one implementation, the constraint satisfaction engine 188 receives a compatibility inquiry message (e.g., from an external system such as the GUI element metadata repository 138) that specifies two GUI element types. The CSE 188 analyzes the two types and returns a compatibility verification message that indicates whether the two types are compatible. In the event the GUI object change violates a constraint satisfaction rule 832 then the compatibility verification message provides detailed information regarding the violation.

The constraint satisfaction engine 188 and the GUI class rules logic 828 may infer GUI class information regarding GUI objects that are present in a navigation path of test script statement vectors 816 and transformed test script statements 826, and whose presence is not explicitly defined. In one implementation, the constraint satisfaction engine 188 and/or GUI class rules logic 828 use a combination of compile time type validation and GUI class inference validation, in order to validate the correctness of test script statement vectors 816 and transformed test script statements 826. For example, when the test script statement vector 816 employs expressions that identify GUI objects whose values can only be determined at runtime, the OR Lookup 172 function may use path traversal logic 824 to identify the possible corresponding GUI object entries 822 and GUI element difference entries 810 in the object repository 174 and GUI difference model 162, respectively. The GUI class rules logic 828 and constraint satisfaction engine 188 then identify the valid GUI object entries 822 that may substitute for the expressions and GUI element difference entries 810 that satisfy valid test script statement vectors 816 and transformed test script statements 826. Similarly, when the transformed test script statement 828 employs expressions that identify GUI objects whose values can only be determined at runtime, the OR Lookup 172 function uses path traversal logic 824 to identify all possible corresponding GUI element difference entries 810 that identify GUI objects that may substitute for the expressions, and the GUI class rules logic 828 and constraint satisfaction engine 188 validate each GUI object substitution for the expressions used to form the transformed test script statement 828.

For example, consider the transformed test script statement 828: VBWindow("s").VBWindow(e1).VBWindow(e2).VBWindow("d"), where the source node GUI object is named "s", the destination node GUI object is named "d", but expressions e1 and e2 compute values of intermediate nodes in the navigation path at runtime. The traversal logic 824 determines intermediate nodes (GUI objects) that may be included in the possible navigation paths identified by the source node "s" and destination node "d". The path traversal logic 824 analyzes the GUI difference model 162 to identify possible constant substitutions for e1 and e2, for example, "a" and "f", so that the transformed test script statement 828 formed by the substitute GUI objects in the navigation path expression "s.a.f.d" can be validated by the GUI class rules logic 828 and/or constraint satisfaction engine 188. By identifying the possible navigation paths leading to the destination node d starting with the source node s the GUI class rules logic 828 and constraint satisfaction engine 188 can conclude whether the transformed test script statement 828 is valid. In the event the traversal logic 824 does not identify at least one navigation path, then the transformed test script statement 828 is invalid. Alternatively, in the event the traversal logic 824 identifies navigation paths leading from s to d by traversing two objects (e.g., e1 and e2), then the transformed test script statement 828 may be valid provided that expressions e1 and e2 evaluate to the names of the nodes in the discovered navigation paths. The traversal logic 824 infers the possible names computed by expressions e1 and e2 at compile time.

Figure 16:
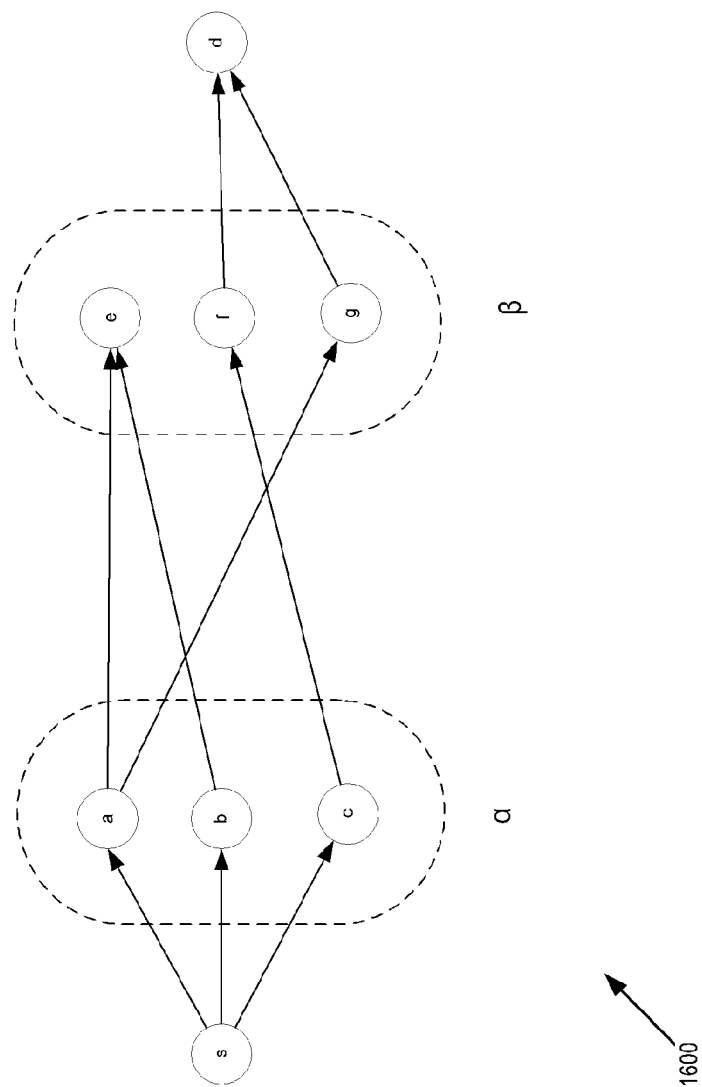
FIG. 16 illustrates navigation paths from a source to a destination object.

A formal description of the traversal logic 824 is provided with reference to FIG. 16. Expressions e1 and e2 may be replaced with the object name variables $\alpha$ and $\beta$ correspondingly, and the original expression is converted into traversal strategy $S = s \rightarrow \alpha \rightarrow \beta \rightarrow d$. The function 'first(s)' computes a set of edges that can be traversed from node s. These edges lead to a set of objects designated by the variable $\alpha$. Function 'first(s)' may be computed using a graph reachability algorithm, included in the path traversal logic 824, and the path traversal logic 824 returns edges that may navigate to the destination node. According to FIG. 16, $\alpha = \{a, b, c\}$. Then for each element of $\alpha$, function 'first' may be computed. As a result, $\beta = \{e, f, g\}$ are obtained, where 'first(a)'=\{e, g\}, 'first(b)'=\{e\}, and 'first(c)'=\{f\}, and 'first(e)'=\{Ø\}, 'first(f)'=\{d\}, and 'first(g)'=\{d\}. From the computed node values the path traversal logic 824 forms a work-list W that includes a set of all computed paths, W=\{(s, a, e), (s, a, g, d), (s, b, e), (s, c, f, d)\}. The path traversal logic 824 analyzes each navigation path of W to determine whether the navigation path contains nodes s and d. Navigation paths identified by the path traversal logic 824 to include nodes s and d, as source and destination nodes, are considered as valid navigation paths. In the event no navigation paths are identified by the traversal logic 824, then the transformed test script statement 828 is invalid because the target GUI element cannot be reached starting from the specified beginning GUI element. The traversal logic 824 similarly validates test script statement vectors 816.

Referring again to FIG. 16, an example of an invalid expression is VBWindow("s").VBWindow(e1). VBWindow(e2).VBWindow(e3).VBWindow("d"). All navigation paths between nodes s and d have at most two objects. Therefore, no matter what values are computed at runtime for expressions e1, e2, and e3 the expressions cannot represent objects in a valid navigation path between the source and the destination objects. Another example of an invalid expression is VBWindow("s").VBWindow("b").VBWindow(e1).VBWindow("d"), because no value for the expression e1 exists that makes the navigation path valid (i.e. that forms a complete path from 's' to 'd').

The constraint satisfaction engine 188 and the GUI class rules logic 828 may infer GUI class information regarding GUI objects that are present in the navigation path of test script statement vectors 816 and transformed test script statements 826. One feature of the SAA 108 is to maintain the compatibility of operations on GUI objects between successive test scripts. When a transformed test script statement 826 attempts to access GUI objects that do not exist in a subsequent GAP version 152 and/or attempts to set a value of a GUI object that is not compatible with the type of the GUI object, the transformed test script statement 826 violates GUI element script change rules entries 830 and/or constraints satisfaction rules 832 imposed on the GUI object. The constraint satisfaction engine 188 and the GUI class rules logic 828 type check each potential transformed test script statement 826 before including the vector in the transformed test script 178, so that invalid operations may be identified and corresponding change guide messages 838 may be output.

The constraint satisfaction engine 188 and the GUI class rules logic 828 use inheritance and sub-typing relations between classes of GUI objects. The concept of class includes hierarchical containments (e.g., GUI scopes and system hierarchies). The object repository 174 and the GUI difference model 162 include GUI class information (e.g., annotating the classes of GUI objects) for each GUI object entry 822 and GUI element difference entry 810. For example, referring to line 1 of Table 7, the SchoolListBox is a WinObject class with properties listed at lines 3-39. In another example, referring to FIGS. 5, 14 and 15, at line 1 of each GUI difference entry (e.g., 504, 1404 and 1504) the GUIElement Type is indicated. The class of each GUI object is indicated as shown in FIGS. 5, 14 and 15 at lines 7, 8 and 8, respectively. The class of a GUI object indicates that the GUI object includes particular attributes, properties and/or traits in common with other GUI objects of the same class that may be extended to and/or inherited by child GUI objects. For example, FIG. 5 at line 7 indicates that the StateListbox GUI object is of a WindowsForms10.ListBox.app4 class that includes values, as indicated at line 11 of FIG. 5. In other words, one property of GUI objects of WindowsForms10.ListBox.app4 is that these GUI objects are expected to have values. Class is a concept that a GUI framework uses to classify GUI objects. For example, class ListBox defines shape, functionality, and the rules of interactivity for GUI objects of this class. Assigning classes to GUI objects facilitates the constraint satisfaction engine 188 and the GUI class rules logic 828 to trace changes between successive GAP versions (e.g., 150 and 152) and perform extended checking on the correctness of operations on GUI objects.

Referring again to FIG. 8, in one implementation, the GUI class rules logic 828 and constraint satisfaction engine 188 determine whether a GUI object has changed and sets the GUI element change status 834. For example, the GUI element change status 834 may use a numerical indicator of 0, 1, and 2, respectively, to indicate that a GUI object was not changed, changed with, and changed without violations of GUI element script change rules 194 and/or constraint satisfaction rules 832. The script analysis logic 820 may use the GUI element change status 834, GUI element script change rule entries 830 and constraint satisfaction rules 832 to search the change guide message repository 192 and identify the appropriate change specifier 184 and change guide message identifiers 836. The GUI element script change rules 830 may indicate whether an element of a GUI object can be changed in a particular way. For example, the GUI element script change rules 830 may indicate that an element of a particular GUI object cannot be changed from a read-only to editable. In another example, a change to the class of a GUI object may result in a child GUI object violating a GUI element script change rule 820, because one or more attributes of the child GUI object conflict with class change of the parent GUI element. In addition, a button may be replaced with a menu items, and actions that are correct for accessing and manipulating buttons will not work for menus.

In another implementation, the GUI element change status 834 is a message that provides a detail description of the change. The GUI element change status 834 may also indicate with a numerical indicator (e.g., −1) that the GUI object has been deleted from the subsequent GAP version 152. When a GUI object has been deleted from the subsequent GAP version 152 and a transformed test script statement 826 includes a reference to the GUI object, the script analysis logic 820 outputs a change guide message 838 that indicates that the GUI object has been deleted.

In one implementation, the script analysis logic 820 outputs a change specifier 184 that includes a transformed test script statement 826 that violates a GUI element script change rule 194 and/or constraint satisfaction rule 832, so that a programmer may evaluate whether to modify the transformed test script statement 826 and/or the subsequent GAP version 152 to obtain a desired result and/or meet a desired requirement that otherwise may not have been apparent. In another implementation, the script analysis logic 820 prohibits the output of transformed test script statements 826 that violate certain GUI element script change rules 194 and constraint satisfaction rules 832. Each of the GUI element script change rules 194 and constraint satisfaction rules 832 may include indicators that indicate the level or severity of violation and whether the script analysis logic 820 may output a transformed test script statement 826, even though a violation has occurred. Regardless of whether the script analysis logic 820 outputs a transformed test script statement 826, the script analysis logic 820 may output a change guide 180 that includes change guide messages 838 corresponding to each of the violations.

For each corresponding GUI element change status 834 that indicates a change in violation of GUI element script change rules 194 and/or constraint satisfaction rules 832, the script analysis logic 820 outputs a set of change guide message identifiers 836 and corresponding change guide messages 838. The change guide messages 838 may include wrong-path delete type (WP-1) 840, wrong-path same (WP-2) type 842 and changed element (CE-1 and CE-2) type 844. The change guide 180 and the change guide messages 838, including 840, 842 and 844, are described in further detail below.

Figure 9:
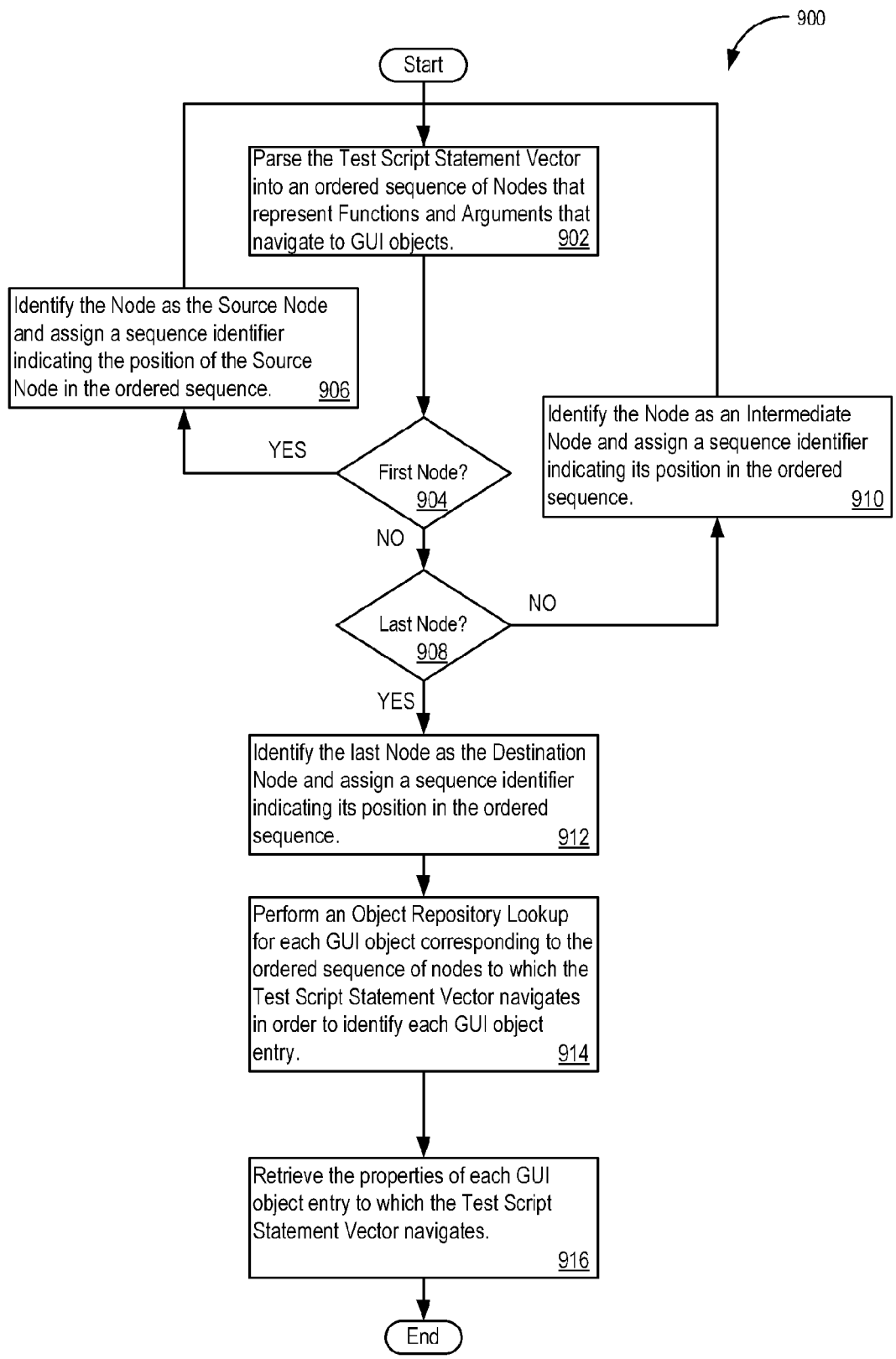
FIG. 9 shows a flow diagram for retrieving the properties of a GUI object entry from an object repository (OR).

FIG. 9 shows a flow diagram 900 for retrieving the properties of a GUI object entry 822 from an object repository (OR) 174. The script parser logic 812 parses the test script statement vector 816 into an ordered sequence of nodes that represent functions and arguments that navigate to GUI objects (902). The script parser logic 812 evaluates the first node of the ordered sequence of nodes (904), and identifies the first node as the source node and assigns a sequence identifier indicating the position of the source node in the ordered sequence (906). The script parser logic 812 evaluates the next node of the order sequence of nodes to determine whether the next node is the last node (908), and identifies the next node as an intermediate node when the next node is not the last node (910). The intermediate node is assigned a sequence identifier indicating the position of the intermediate node in the ordered sequence. The script parser logic 812 may identify all intermediate nodes between the source node and the destination node.

The script parser logic 812 identifies the last node in the ordered sequence as the destination node and assigns a sequence identifier to the destination node that indicates the position of the destination node in the ordered sequence (912). The OR Lookup 172 performs an object repository lookup for each GUI object corresponding to the ordered sequence of nodes to which the test script statement vector navigates so that each GUI object entry 822 is identified (914). In one implementation, the ordered sequence of nodes is used by the path traversal logic 824, GUI class rules logic 828 and/or constraint satisfaction engine 188 to validate the statements of the current test script 164. In one implementation, the script analyzer 170 uses the ordered sequence of nodes to infer GUI class and inheritance (subclass) information for GUI objects. Where at least one of the source, destination and/or the intermediate nodes are expressions that can only be identified at run-time, the path traversal logic may identify possible GUI object entries 822, and the GUI class rules logic 828 and/or constraint satisfaction engine 188 determine the GUI object entries 822 that satisfy the test script statement vector 816 without violating the GUI class rules logic 828 and the constraint satisfaction rules 832. The OR Lookup 172 retrieves the properties of the GUI object entries 822 to which the test script statement vector navigates (916).

Figure 10:
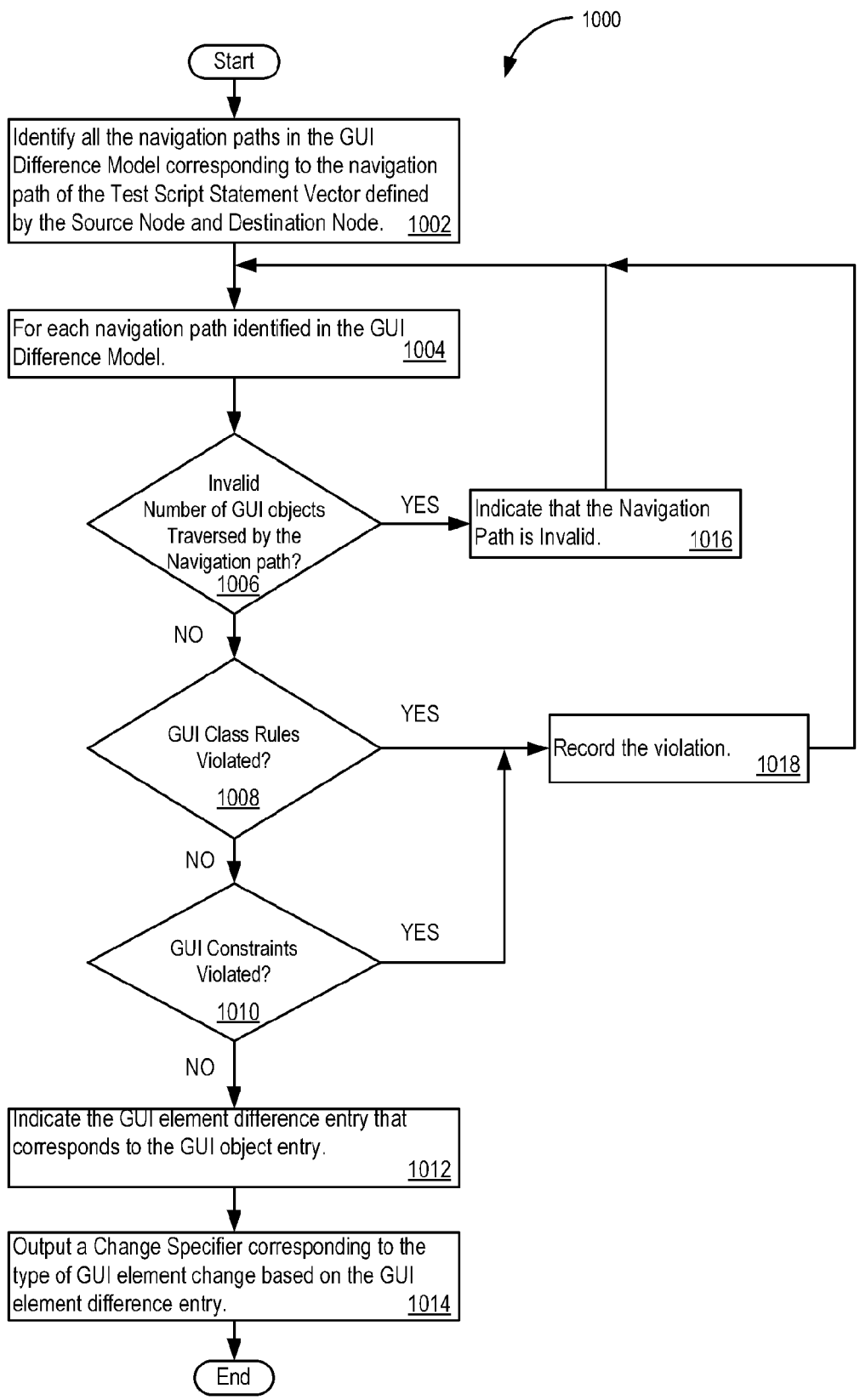
FIG. 10 shows a flow diagram for identifying a GUI difference entry corresponding to a GUI object entry.

FIG. 10 shows a flow diagram 1000 for identifying a GUI difference entry 810 corresponding to a GUI object entry 822. The OR Lookup 172 receives the properties of the GUI objects corresponding to the source, destination and all intermediate nodes of the test script statement vector 816. In one implementation, the OR Lookup 172 employs the path traversal logic 824 to identify possible GUI difference entries 810 corresponding to the navigation paths identified by a source node and a destination node to which a test script statement vector navigates (1002). Where at least one of the GUI element difference entries 810 is an expression that can only be identified at run-time, the path traversal logic 824 identifies one or more possible GUI difference entries 810 that form a navigation path between the source node and the destination node (1004). The path traversal logic 824 determines whether the GUI difference entries 810 form a valid navigation path between corresponding source and destination nodes GUI difference entries 810 (1006). The GUI class rules logic 828 and/or the constraint satisfaction engine 188 determine whether the GUI difference entries 810 that form the navigation path violate GUI class rules logic 828 (1008) and constraint satisfaction rules 832 (1010).

The GUI class rules logic 828 and/or constraint satisfaction engine 188 indicate the GUI element difference entries 810 that correspond to each of the GUI object entries 822 forming a valid navigation path (1012). The script analysis logic 820 determines the output change specifier based on the type of GUI element change (e.g., GUI element change status 834) indicated by the GUI class rules logic 828 and constraint satisfaction engine 188 results, based on the GUI element difference entry 810 (1014).

When the path traversal logic 824 identifies a navigation path that traverses an invalid number of GUI element difference entries 810 between corresponding source and destination node GUI difference entries 810, the path traversal logic 824 indicates that the navigation path is invalid (1016). In one implementation, invalid navigation paths are not analyzed by the GUI class rules logic 828 and constraint satisfaction engine 188, and a transformed test script statement 826 is not output as a result. In one implementation, the path traversal logic 824 outputs a warning message identifying the invalid navigation paths. In another implementation, the change guide includes a warning message indicating the invalid navigation paths. The change guide 180 may include various warning messages that reflect any number of conditions identified during processing by the script analyzer 170. The change guide 180 may include warning and/or informational messages corresponding to conditions encountered by script analyzer 170 and/or any of the logic of the script analyzer 170 (e.g., the script parser logic 812, script analysis logic 820, OR Lookup logic 172, path traversal logic 824, and GUI class rules logic 828) and/or the constraint satisfaction engine 188. The script analysis logic 820 may output a change guide 180 with change guide messages 838 (e.g., 840, 842 and 844) corresponding to the recorded GUI class rules logic 828 and constraint satisfaction rules 832 violations (1018).

FIG. 11 shows a transformed test script 178 for the subsequent GAP version 152. The transformed test script 178 may include statements automatically transformed by the script analysis logic 820. The transformed test script 178 may also include statements manually entered after review of the change guide 180. In the example shown in FIG. 11, the script analysis logic 820 outputs the transformed test script 178 with the transformed test script statements at lines 1, 6-11, 14-19, and 21-22, while a script writer has manually entered lines 2-4. The script analysis logic 820 determines the transformed test script statements 826 to output to the transformed test script 178 based on the GUI class rules logic 828 and GUI element script change rules 194. The complexity of the GUI class rules logic 828 and GUI element script change rules 194, and the richness of the GUI difference model 162 and GUI element metadata may be specified at any level of complexity to drive how much of the transformed test script 178 the script analysis logic 820 outputs without programmer input.

For example, the script analysis logic 820 transforms lines 1-3 of the current test script 164, shown in FIG. 6, into transformed test script statements 826 lines 1, 5-7, shown in FIG. 11. A programmer may input lines 2-4 of the transformed test script 178, because those lines include new GUI objects (e.g., "ToolbarWindow32" and values "My Computer") for which the GUI difference model 162 may not include information that identifies a corresponding GUI object in the current GAP version 150. In one implementation, the GUI difference model 162 and the GUI element metadata provide the GUI class, GUI typing and mapping information necessary for the script analysis logic 820 to infer lines 2-4 of the transformed test script 178, given that the "university.data" in line 6 represents a destination in a path traversal from which the intermediate test script statements may be determined. In another example, the GUI difference model 162 and/or the GUI element metadata include GUI class and mapping information that the script analyzer 170 uses to transform line11 of the current test script 164 that refers to WinObject "Save File" into transformed test script statements 826 lines 16-17 that refer to a "Save File" child GUI object of the WinObject "menuStrip1".

Figure 12:
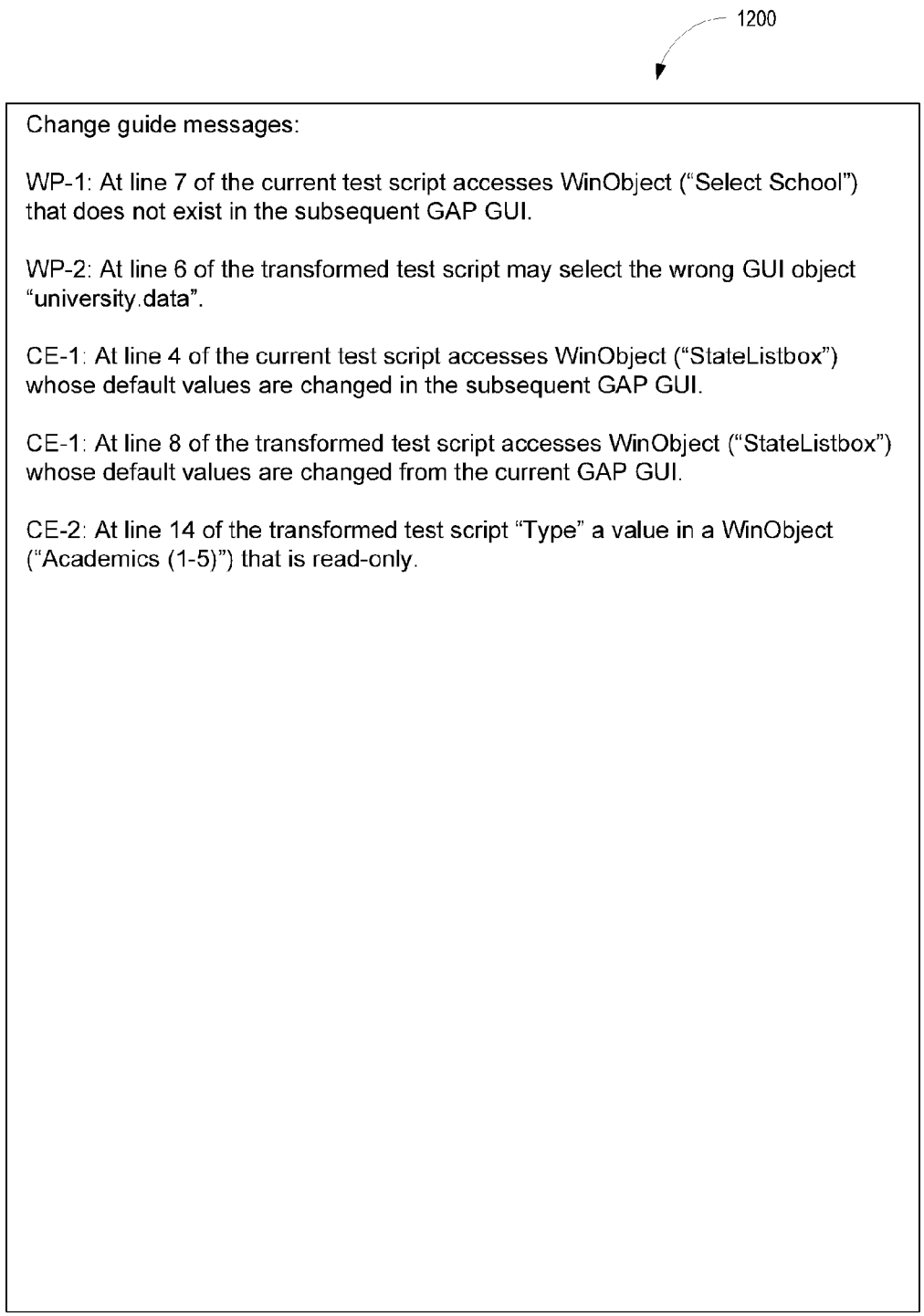
FIG. 12 shows a change guide.

FIG. 12 shows a change guide 180 that the script analyzer 180 may output. In one implementation, the script analysis logic 820 outputs a change specifier 184 that indicates whether the transformed test script statement 828 violates a GUI element script change rule 194 based on analysis performed by the GUI class rules logic 828 and/or the constraint satisfaction engine 188. The script analyzer 170 outputs change specifiers 184 that may also include transformed test script statements 826. The script analyzer 170 determines the modifications to GUI objects and the transformed test script statements 828 that are affected by the modifications to the GUI objects to which the transformed test script statements 828 refer. In one implementation, the script analysis logic 184 determines the GUI objects referred to in the current test script 164 that are deleted in the subsequent GAP version 152. The script analyzer 170 outputs change specifiers 184 that may include change guide messages 838, transformed test script statements 826, and/or both. In one implementation, the script analyzer 170 outputs change specifiers 184 that include change guide message identifiers 830, transformed test script statements 826, and/or both.

Some of the types of changes to GUI objects between successive releases of GAPs that the script analyzer 170 may identify in a change guide message 838 include: (A) a new GUI object added to a subsequent GAP version 152; (B) a GUI object is deleted from a subsequent GAP version 152; (C) the values of one or more attributes of a GUI object are modified; (D) the values of a GUI object are different; and (E) the type of a GUI object is different. GUI object changes of types A and B occur when GUI objects are added and removed correspondingly from current GAP version 150 and subsequent GAP version 152. For example, adding the WinObject menustrip1 308 to the subsequent GAP version 152 is a type A change, while removing the WinObject "Select School" 204 is a type B GUI object change. Referring to FIG. 4, notice that the "Select School" has been removed at 412.

An example of a type C change is the change of the window name from StateList 202 to School 302. Adding or removing values from GUI objects such as list and combo boxes are examples of modifications of the type D change. For example, the listbox StateListbox 212 in current GAP version 150 is identified in the subsequent GAP version 152 as StateListbox 304, and referring to the GUI difference entry 504 the values for SeqNumber="8" are "District of Columbia" and "Florida" for successive GAP versions, respectively. Changing the "type" of a GUI object may include replacing a class of the window that is used to represent the object and/or changing the high-level concept that describes the values that the GUI object takes. For example, changing the type of the static label to a read-only combo box is a modification of the type E. Another example of a type E change includes the change of the listbox "SchooListbox" 216 to a combobox "SchoolCombobox" 306.

The script analyzer 170 classifies the types of changes that the GUI class rules logic 828 and/or the constraint satisfaction engine 188 identify, including: Wrong-Path type 1 (WP-1) errors that occur when a script accesses GUI objects that may be deleted in the subsequent GAP version 152 (e.g., see "Select School" 218 and 412 as shown in FIG. 4). WP type 2 (WP-2) errors occur in scripts that read or write to the wrong GUI objects. WP-2 errors occur when transformed test script statements 826 navigate to wrong GUI objects and read the values of the wrong GUI object and/or invoke methods on the wrong GUI object.

For example, consider the statement in lines 2 and 6 of the current test script 164 and transformed test script 178, respectively:

Window("StateList").Dialog("Open").WinListView("SysListView32").Select"university.data".

The statement selects "university.data" from a WinListView "SysListView32". However, lines 2-4 of the transformed test script 178 may navigate to and invoke the Select method on the wrong GUI object "university.data", because the GUI objects referenced in lines 2-4 of the transformed test script 178 are new GUI objects that are not referenced in the current test script 164. Thus, when the properties of existing GUI objects are modified and/or other GUI objects are added into a subsequent GAP version 152, the result of interference of these operations is that the transformed test script statement 826 may access and read values of objects that are different from those as originally intended.

Changed-Element (CE) errors occur when statements attempt to access GUI objects whose types, properties, or default values are changed in the subsequent GAP version 152 (CE-1). For example, the GUI difference entry 504 indicates that there are different values for SeqNumber="8" are "District of Columbia" and "Florida" for successive GAP versions, and the script analysis logic 820 may consequently issue a change guide message 844 indicating that a CE-1 type error has occurred.

The script analysis logic 820 may issues a change guide message 844 corresponding to a CE-2 type error, when a transformed test script statement 826 attempts an operation on a GUI object that does not take into consideration new constraints imposed on the elements, for example, attempting to write data to a read-only text box. Referring to the GUI element difference entry shown in Table 8, the WinObject "AcadScale" referred to in the current test script 164 at line 8 is an editable object that has been transformed into the WinObject "Academics (1-5)" in the subsequent GAP version 152 where the object is read-only. In one implementation, the script analysis logic 820 outputs a change guide message 844 to indicate a CE-2 type change has occurred.

TABLE 8

GUI Element Difference entry for AcadScale

```
<GUIElement Type = "AcadScale Textbox">
  <Version> 0
    - <GUIElement Alias="AcadScale">
      <UniqueID>0xcb</UniqueID>
      <HWND>0x1a0b3c</HWND>
      <Location x="573" y="790" width="32" height="23" />
      <Class>WindowsForms10.EDIT.app4</Class>
      <Style>0x560100c0</Style>
      <ExStyle>0xc0000a00</ExStyle>
    - <GUIElement Alias="AcadScale">
      <UniqueID>0x4</UniqueID>
      <HWND>0x1a0b3c</HWND>
      <Location x="575" y="792" width="28" height="19" />
      <Class>WindowsForms10.EDIT.app4</Class>
      <Style>0x560100c0</Style>
      <ExStyle>0xc0000a00</ExStyle>
      - <Values>
      <Value SeqNumber="3" />
      </Values>
      </GUIElement>
    </GUIElement>
  </Version>
  <Version> 1
    - <GUIElement Alias="Academics (1-5)">
      <UniqueID>0x2ff</UniqueID>
      <HWND>0x70d0e</HWND>
      <Location x="597" y="388" width="111" height="17" />
      <Class>WindowsForms10.STATIC.app.0.378734a</Class>
      <Style>0x5600000d</Style>
      <ExStyle>0xc0000800</ExStyle>
    - <GUIElement Alias="Academics (1-5)">
      <UniqueID>0x308</UniqueID>
      <HWND>0x70d0e</HWND>
      <Location x="597" y="388" width="111" height="17" />
```

TABLE 8-continued

GUI Element Difference entry for AcadScale

```
      <Class>WindowsForms10.STATIC.app.0.378734a</Class>
      <Style>0x5600000d</Style>
      <ExStyle>0xc0000800</ExStyle>
      - <Values>
        <Value SeqNumber="3">Academics (1-5)</Value>
      </Values>
      </GUIElement>
    </GUIElement>
  </Version>
</GUIElement>
```

Knowing the modification type for a GUI object facilitates the script analysis logic 820 to determine the appropriate change guide message 838 and transformed test script statements 826 to output. For example, when a transformed test script statement 826 attempts to set values in a text box object, although the type of the object has changed to a read-only combo box, the script analysis logic 820 outputs change guide messages 844 that suggests how to modify the transformed test script statement 826 to select values in the combo box using appropriate interfaces.

Figure 13:
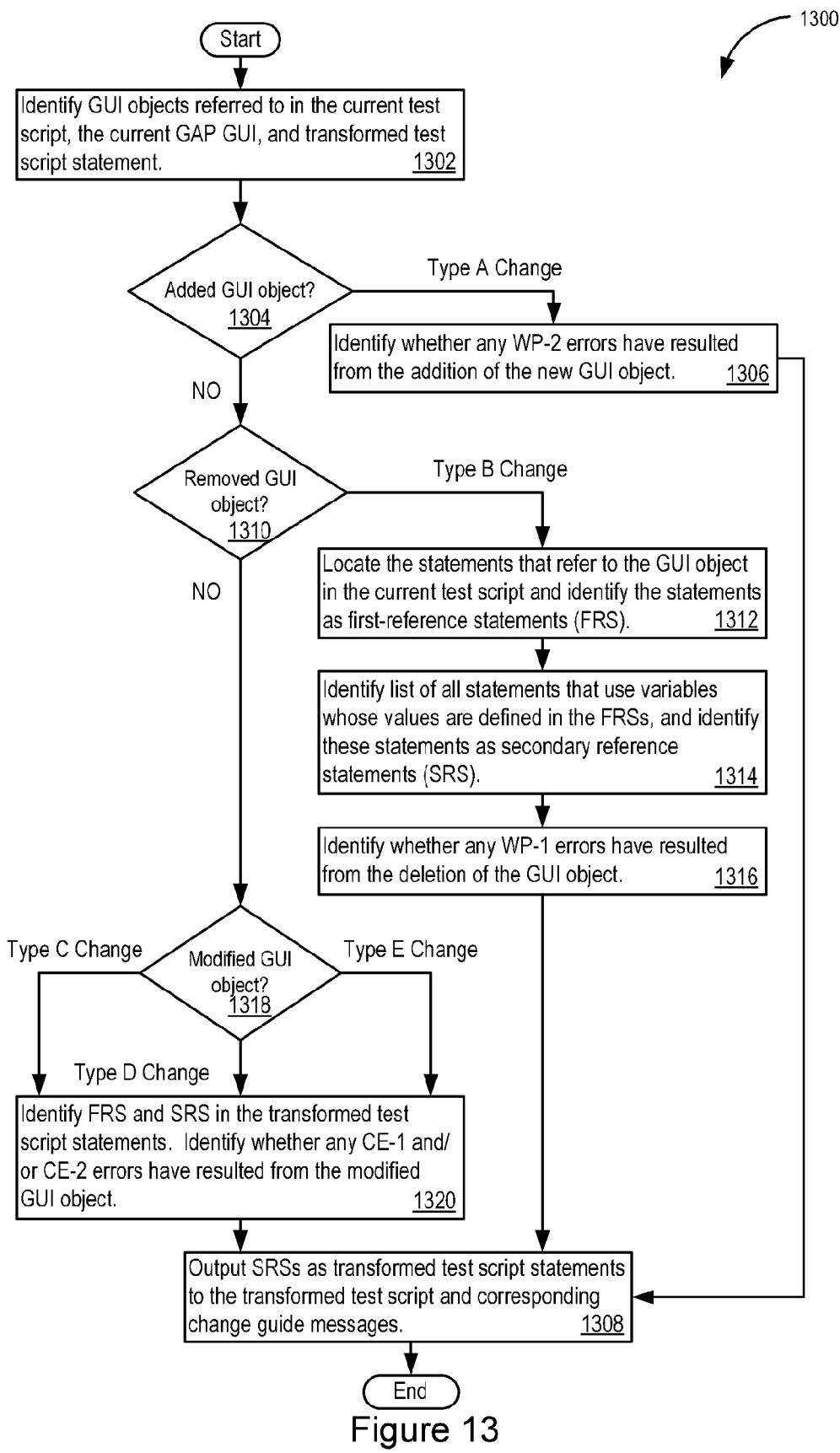
FIG. 13 shows a flow diagram for outputting transformed test script statements.

FIG. 13 shows a flow diagram for outputting transformed test script statements 826. The script analysis logic 820 reviews the GUI element change status 834 of each GUI object referred to in the current test script 178, the current GAP version 150 and/or the transformed test script statement 826 (1302). The script analysis logic 820 determines whether the GUI objects of the transformed test script statement have been added to the subsequent GAP version 152 (1304). The GUI class rules logic 828 and/or constraint satisfaction engine 188 may analyze the added GUI objects to determine whether a WP- 2 error has occurred as a result of the transformed test script statements 826 navigating to wrong GUI objects (e.g., two GUI objects incorrectly using identical aliases) and read the values of the wrong GUI object and/or invoke methods on the wrong GUI object (1306). The transformed test script statement 826 is include in the transformed test script 178 and corresponding change guide messages 838 are output (1308).

When the script analysis logic 820 determines that GUI objects have been removed from a current GAP version 150 (1310). The script analysis logic 820 locates the statements that reference these removed objects in the current test script 178. The script analyzer 170 refers to these statements as first-reference statements (FRS) (1312). The variables used in these statements are obtained, and the statements that use the variables whose values are defined in the FRSs are referred to as secondary reference statements (SRS) (1314). The GUI class rules logic 828 and/or constraint satisfaction engine 188 may analyze the GUI objects to determine whether WP-1 errors have occurred based on the script statements attempting to access GUI objects that have been deleted in a subsequent GAP version 152 (1316). When a statement of the current test script 178 refers to a variable whose value points to a removed GUI object, the statement of the current test script 826 is considered an SRS. In one implementation, the script analyzer 170 outputs the identified SRSs as transformed test script statements 826 and corresponding change guide messages 838, so that test personnel can review and decide how to modify the SRSs (1308).

When the values of one or more attributes of a GUI object are modified, a type C modification is performed (1318). FRSs and SRSs are identified in transformed test script statements 826 for the GUI object with the modified attributes and change guide messages 838 are output. When the values of GUI objects are added or removed, modifications of the type D occur (1318). After locating FRSs that reference GUI objects whose values have been changed, SRSs are found and the script analyzer determines the impact due to the SRSs. When the type of a GUI object is modified then a modification of the type E occurs that involves locating FRSs, checking the new types of the GUI object, invoking corresponding type subsumption rules (e.g., rules the GUI class rules logic 828 may apply) (1318). The GUI class rules logic 828 and/or constraint satisfaction engine 188 may analyze the modified GUI objects to determine whether CE-1 and CE-1 errors have occurred as a result of the transformed test script statement 826 attempting to access GUI objects whose types, properties, or default values are changed in a subsequent GAP version 152, and/or attempting an operation on a GUI object that does not take into consideration new constraints imposed on the elements of the GUI object (1320). In one implementation, the script analyzer 170 outputs the identified SRSs as transformed test script statements 826 and corresponding change guide messages 838, so that test personnel can review and decide how to modify the SRSs (1308).

Figure 17:
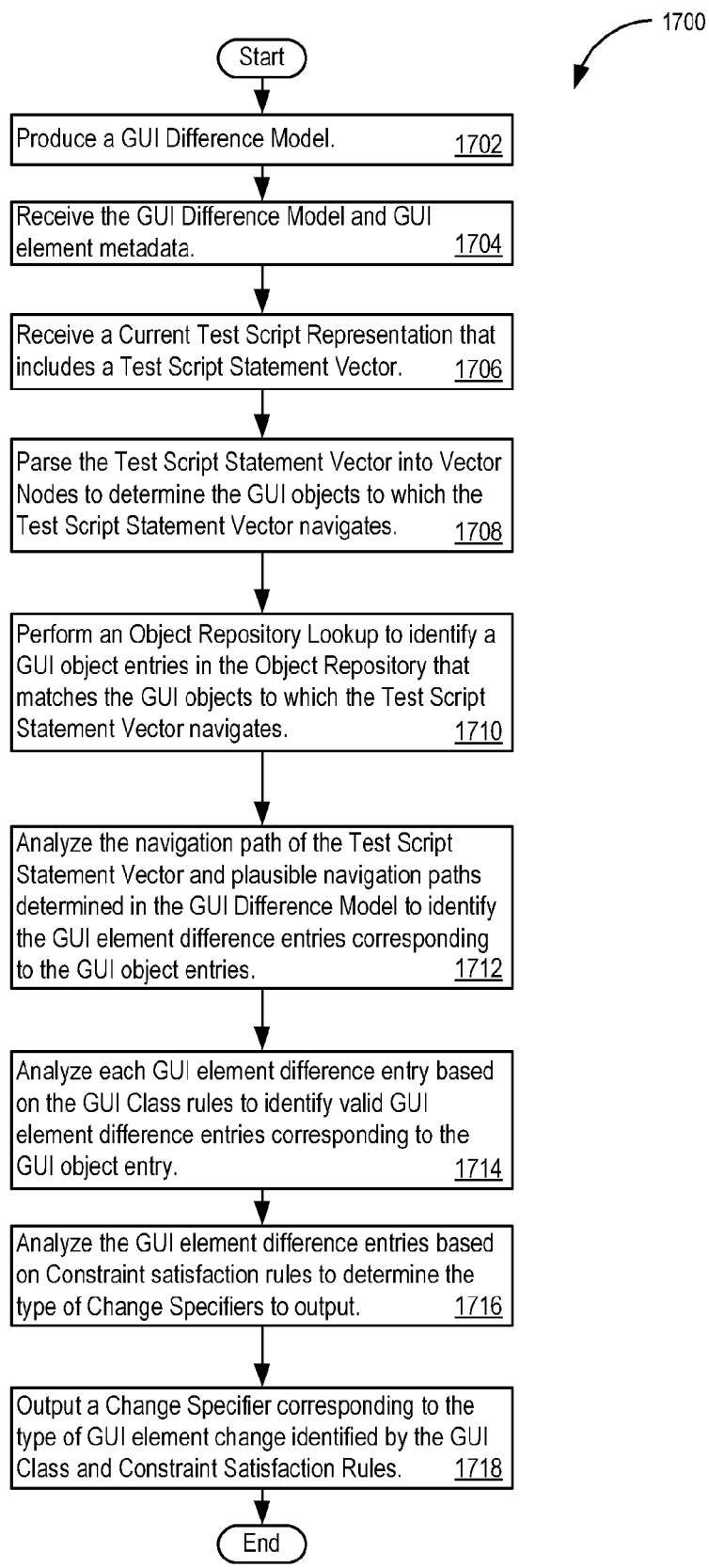
FIG. 17 shows a flow diagram for outputting a GAP change specifier.

FIG. 17 shows a flow diagram for outputting a GAP change specifier 184. A GUI difference model 162 is produced (1702) and the script analyzer 170 receives the GUI difference model 162 and GUI element metadata 140 (1704). The script analyzer 170 receives a current test script representation 814 that includes a test script statement vector 816 (1706). The script parser logic 812 parses the test script statement vector 816 into vector nodes to determine the GUI objects to which the test script statement vector 816 navigates (1708). The script parser logic 814 invokes the OR Lookup 172 for each GUI object identified by the test script statement vector 816 to retrieve the properties of the GUI objects from the object repository 174 (1710). The path traversal logic 824 analyzes the navigation path of the GUI element difference entries 810 that correspond to the GUI objects identified by the test script statement vector 816 (1712). The GUI class rules logic 828 analyzes the GUI element difference entries 810 based on the GUI class rules logic 828 and GUI element script change rules 830 to identify valid GUI element difference entries 810 to which the navigation path corresponds (1714). The constraint satisfaction engine 188 analyzes the GUI element difference entries 810 based on the constraint satisfaction rules 832 to determine the type of change specifier to output, including whether to output a transformed test script statement 826, a change guide message 838, or both (1716). The script analysis logic 820 outputs a change specifier corresponding to the type of GUI element change identified by the GUI class logic 828 and constraint satisfaction rules 832 (1718).

In one implementation, the SAA 108 uses adaptive programming including class and object graphs and an abstraction that treats all objects uniformly. The traversal logic 824, constraint satisfaction engine 188 and the GUI class rules logic 828 may distinguish complex and simple types of GUI objects. Complex types contain fields while simple types do not. Let T be finite sets of type names and F of field names or labels, and two distinct symbols this $\in$ F and $\diamond \in$ F. Type graphs are directed graphs G=(V, E, L) such that:

V $\subset$ T, the nodes are type names;

L $\subseteq$ F, edges are labeled by field names, or "$\diamond$" where fields do not have names. Edges that are labeled by "$\diamond$" are called aggregation edges, and edges that are labeled by field names reference edges. The difference between aggregation and reference edges becomes clear with the following example. Fields of classes in object-oriented languages designate instances of some classes, and these fields have names that are used to reference the fields. Each field of a class is defined by the name of the field and the name of the class (type) that this field is an instance of. The name of a field is the label of the corresponding reference edge in the type graph.

When a class designates a GUI object $o_k$ and the other class designates a GUI object $o_n$ that is contained in the object $o_k$, the type graph has two nodes, one for the object $o_k$ and the other for the object $o_n$ that the object $o_k$ contains. The names of the corresponding classes serve as their types. The relation between two nameless objects is represented using the edge labeled with the "$\diamond$" in the type graph.

E $\subset$ L×V×V, edges are cross-products of labels and nodes;

for each v$\in$ V, the labels of all outgoing edges with the exception of "$\diamond$" are distinct;

for each v$\in$ V, where v represents a concrete type, $$v \xrightarrow{this} v \in E.$$

An object graph is a labeled directed graph O=(V', E', L') that is an instance of a type graph G=(V, E, L) under a given function Class that maps objects to their classes, if the following conditions are satisfied:

for all objects o$\in$ V', o is an instance of the concrete type given by function Class(o);

for each object o$\in$ V', the labels of its outgoing reference edges are exactly those of the set of labels of references of Class(o) including edges and their labels inherited from parent classes;

for each edge $$o \xrightarrow{e} o' \in E',$$

Class(o) has a reference edge $$v \xrightarrow{e} u$$

such that v is a parent type of Class(o) and u is a parent type of Class(o').

An object graph is a model of the objects, represented in GAPs, and their references to each other. A collection of fields in an object graph is a set of edges labeled by field names. A collection of aggregated objects in an object graph is a set of edges labeled by "$\diamond$". A path in a type graph G=(V, E, L) is a sequence of nodes and labels $p_G=(v_0e_1,v_1e_2, \ldots e_nv_n)$, where $v_i \in$ V and $$vi \xrightarrow{ei+1} vi+1 \text{ for } 0 \leq i \leq n$$

A concrete path is defined as an alternating sequence of type names and labels designating reference edges. In general a concrete path $p_c$ is a subset of the corresponding type path $p_G$, i.e. $p_c \subseteq p_G$.

An object graph has the special object $o_r \in$ V', $o_r$ is a collection of root objects $o_r \subset$ V' in the object graph O given by function root: O→$o_r$. This object has type Class($o_r$)=root and its relation with objects in its collection is expressed via $o_r \rightarrow \diamond \rightarrow o' \in$ E'.

Given an object o of some type the traversal logic 824, constraint satisfaction engine 188 and the GUI class rules logic 828 work together to identify one or more reachable objects that satisfy certain criteria. The task performed is equivalent to determining whether test script statement vectors 816 and/or transformed test script statements 826 that describe navigation paths are valid. Navigation paths specified in transformed test script statements 826 can be thought of as specification of constraints for the object reach-ability problem. Finding reachable objects is done via traversals. The traversal of an edge labeled e corresponds to retrieving the value of the e field. Every edge in the object graph is an image of a has-part edge in the type graph: there is an edge $e(o_1, o_2)$ in O only when there exist types $v_1$ and $v_2$ such that object $o_1$ is of type $v_1$, $v_1$ has an e-part of type $v_2$, and $o_2$ is of type $v_2$.

The first node of a path p is called the source of p and the last node is called the destination of p. A traversal of an object graph O started with an object $v_i$ and guided by paths from a set of paths p is done by performing depth-first search on O with p used to prune the search. The resulting traversal history is a depth-first traversal of the object graph along object paths agreeing with the given concrete path set.

The problem of identifying all reachable objects from a given object o that satisfy certain criteria is formalized as follows. For each pair of classes c and c', a set of edges e may be identified by computing FIRST(c, c') iff it is possible for an object of type c to reach an object of type c' by a path beginning with an edge e. More precisely, FIRST(c, c')=e∈E, such that there exists an object graph O of C and objects o and o' such that: 1) Class(o)=c; 2) Class(o')=c'; and 3) o e*o'.

The last condition, o e*o' indicates that there is (∃) a path from o to o' in the object graph, consisting of an edge labeled e, followed by any sequence of edges in the graph. The lack of information about the actual graph is represented by the existential operator ∃.

The task of static checking of test scripts (e.g., transformed test scripts 178) is greatly simplified when the names of foreign components names are defined as string constants. When the names of GUI objects are specified using expressions, the values of these expressions may not be determined until run-time. Type graphs facilitate the script analyzer system 800 to infer types of expressions and variables that hold the names of GUI objects. The script analyzer system 800 applies concepts based on the Traversal Graph Analysis (TGA) defined in adaptive programming to infer types of expressions and variables.

An adaptive strategy S=(R, π, δ) represents paths in an object graph, where R={s, d}, where s and d are the source and destination GUI objects of a path in an object graph, and R ⊂ O, where O is the set of objects in a type graph, π={e, α}, where e is a set of fields and α is a set of variables that designate a set of some edges α ⊂ e, and δ={→, ⇀} is a set of transition edges representing objects and attributes respectively. Each element in a strategy S is either the name of some object or a variable designating an object and/or attributes.

The expression π(o, o') designates a set of objects {o'}, such that each object o' of the set is a part of the object o expressed by some edge e∈π such that e(o, o'). For example, test script statements may be considered strategies that define strategy graph edges a→b and a⇀b for test script statements Window("a").VBWindow("b") and Window("a").VBWindow("b").property("ReadOnly"), respectively. Thus, a strategy is an abstraction of test script statements (e.g., transformed test script statements 826), as well as an abstraction of a set of paths in a type graph.

For example, a type graph of an organizational structure of a company may include: a CEO as a root type of some GUI object that contains the GUI object stock of type integer and aggregates type CTO. CTO is a type that has GUI objects salary of type Check and boss of type CEO. Type Check has in turn fields amount of type float and issuer of type CEO. A strategy CEO→α1→α2 ⇀ amount for the test script statement:

Window("CEO").Window(strexp1).Window(strexp2).property("amount") for the type graph described above designates strategy S, where s=CEO, d=amount, α1 is a variable designating objects computed via string expression strexp1, and α2 is a variable designating attribute object computed via string expression strexp2. Computing π(CEO, o') the type {CTO} is obtained, and computing π(CTO, o') the types {CEO,check} are obtained.

Each node in a strategy is assigned a distinct sequence number, and nodes are expressed as pairs (i, π). Given functions Δi: N×N→δ and Δπ:π×π→δ and two sequential natural numbers k and k+1, the function Δi computes the transition edge between nodes that are assigned these numbers in S, and ∅ if there is no transition edge. Correspondingly, given two nodes $π_q$ and $π_r$ in some type graph, function Δπ computes the transition edge between nodes, and ∅ if there is no transition edge.

When the values of string expressions in test scripts statements cannot be computed until run-time, the string expressions may be inferred. The path traversal logic 824, constraint satisfaction engine 188 and the GUI class rules logic 828 work together to analyze transformed test script statements, using type graphs by transforming transformed test script statements 826 into an adaptive strategy with variables replacing string expressions. The constraint satisfaction engine 188 and/or the GUI class rules logic 828 computes possible values for each variable and generates traversal paths for each strategy. Where no path is identified between the source and the destination objects, then a type GUI element script change rule entry 830, change guide message 838 and change specifier 184 may be reported. Where at least one path is identified, then a corresponding change guide message 838 and change specifier 184 are generated, since values of expressions that compute names of objects may not be in the computed paths. In one implementation, the path traversal logic 824, constraint satisfaction engine 188 and the GUI class rules logic 828 may be similarly applied to validate test script statements in the current test script 164.

The path traversal logic 824 identifies one or more possible paths, while the constraint satisfaction engine 188 and the GUI class rules logic 828 validate paths for the expressions and statements. The constraint satisfaction engine 188 and the GUI class rules logic 828 compute the set of edges e for each pair of classes c and c', by computing FIRST(c, c') where an object of type c exists that can reach an object of type c' by a path beginning with an edge e. Recall from above that FIRST (c, c')=e∈E, such that there exists an object graph O of C and objects o and o' such that: 1) Class(o)=c; 2) Class(o')=c'; and 3) o e*o'.

The last condition, o e*o' says that there is (∃) a path from o to o' in the object graph, consisting of an edge labeled e, followed by any sequence of edges in the graph. In one implementation, the method FIRST is implemented using two sets of logic: path traversal logic 824 and GUI class rules logic 828.

The path traversal logic 824 takes the set R of source and destination components in S and set π as input parameters. The path traversal logic 824 outputs a tree of valid paths in a type graph that satisfy a given strategy. Some of the input components may not make it into the path tree because they do not start any valid paths.

In one implementation, the path traversal logic 824 invokes the GUI class rules logic 828, which in turn recursively calls itself. The GUI class rules logic 828 uses three parameters: a component o that is a potential current node in the path, sequence number i of the node in the strategy S, and the transition edge δ between nodes in S that are assigned two sequential natural numbers i and i+1. The goal of the GUI class rules logic 828 is to color the potential current node o in the path as either red or blue. Where colored red object o is considered a dead end on the path in the type graph that does not lead to the designated destination nodes. Otherwise, the node is colored blue and this color is propagated up to the source nodes which are subsequently included in the path tree.

The GUI class rules logic 828 completes when the sequence number i is equal to or the greater of the number of nodes in the strategy, $|\pi|$, and/or where there is no transition edge from the current node. When the GUI class rules logic 828 completes, the GUI class rules logic 828 colors the current node blue. In the calling procedure the color of the node is checked, and where the node is blue, then node is attached to its parent node in the path tree.

In one implementation, the constraint satisfaction engine 188 and the GUI class rules logic 828 work together to compute the set of edges e for each pair of classes c and c', where an object of type c is identified that can reach an object of type c' by a path beginning with an edge e. The logic is applied individually to each transformed test script statement 826 in which foreign GAP objects are specified using string expressions whose values are not known before the transformed test script 178 is executed. The constraint satisfaction engine 188 and the GUI class rules logic 828 work together to infer possible names of foreign objects that string expressions may evaluate to at runtime.

TABLE 9

Path Traversal and GUI class rules logic

```
Path Traversal Logic (R ∈ S, π ∈ S)
for all s ∈ R do
   GUI class rules logic (s, 0, Δi(0,1))
   if color(s) = red then
      remove s from R
   end if
end for
GUI class rules logic (o ∈ O, i ∈ N, ∂ ∈ δ)
if i ≧ |π| or ∂ = Ø then
   color(o) ↦ blue
else
   for all o' ∈ πi(o, o') do
      if Δπ(o,o') = ∂ then
         GUI class rules logic (o', i + 1, Δi(i, i + 1))
         if color(o') = blue then
            AddChildToTree(o, o')
         end if
      end if
   end for
   if children(o) = Ø then
      color(o) ↦ red
   else
      color(o) ↦ blue
   end if
end if
```

Often the same string expressions are used in different statements in the same scripting scope. The same expressions compute the same values, where the expressions are located in the same scope, provided that the values of the variables used in these expressions are not changed. Using program analysis techniques the path traversal logic 824, constraint satisfaction engine 188 and GUI class rules logic 828 work together to detect expressions at compile time whose variables are not changed at run-time. The path traversal logic 824 identifies one or more possible names of foreign GUI objects that may be substituted for string expressions in test script statements. While the constraint satisfaction engine 188 and the GUI class rules logic 828 identifies from among the possible names of foreign GUI objects, those GUI objects that do not violate constraint satisfaction rules 832 and/or GUI element script change rules 194. Given the same expression used in different test script statements in the same script scope, and provided that the values of the variables used in these expressions are not changed by other expressions executed between these statements, the constraint satisfaction engine 188 and/or the GUI class rules logic 828 identify a set of names of foreign GUI objects computed by these string expressions. This set of GUI objects is obtained by taking the intersection of the sets of names computed by the path traversal logic 824.

For example, consider the strategy graph S1 CEO→ α1→α2↗ amount for the type graph discussed above for the transformed test script statement 826 expression: Window ("CEO").Window(strexp1).Window(strexp2).property ("amount"). The constraint satisfaction engine 188 and/or the GUI class rules logic 828 computes values for type scheme variables α1={CTO} and α2={boss, salary}.

Suppose a different strategy graph S2 exists, where Programmer→α2↗ bonus for y["Programmer"][strexp2] .attribute("bonus") for some other type graph. Notice that the string expression variable strexp2 is the same in both statements, and because of that the string expression variable strexp2 is designated by the same type scheme variables in both the strategy graphs. Suppose that by applying the path traversal logic 824 that values for type scheme variable α2={salary} are computed. In one implementation, in order to determine the value of variable α2 that satisfies both S1 and S2, the GUI class rules logic 828 identifies the intersection of the sets of values of α2 computed for these two strategies. The resulting set α2={salary} is the result of pruning the navigation paths.

This example illustrates the idea of pruning navigation paths using context-sensitive dataflow analysis that may be used by the constraint satisfaction engine 188 and/or the GUI class rules logic 828. By determining definitions and uses of a variable that designate names of GUI objects in a given scope, sets of values are computed for each transformed test script statement in which a variable is used. Then the intersection of these sets is taken to determine common values that this variable can take in the scope considered.

The script analyzer system 800 provides modularization integrity as a mechanism for ensuring maintainability of transformed test scripts 178. Modularization integrity specifies that each statement in a transformed test scripts 178 may only communicate directly with the objects that belong to GUIs for which the transformed test scripts 178 is created. Compositions of transformed test scripts 178 in which GUI objects are accessed by calling functions exported by transformed test scripts 178 should not violate modularization integrity. The script analyzer system 800 ensures the modularization integrity of transformed test scripts 178 by analyzing compositions of transformed test script statements 824 to build the transitive relations between the current test script 164 and the transformed test script 178.

For example, a statement Func("y", "z"), found in a suite of related test scripts, navigates to the field z of foreign GUI object y in some test scripts that export function Func. Thus, the some test scripts in the suite of related test scripts may violate the modularization integrity by implicitly interoperating the test scripts via the function Func even though this communication may be prohibited by the constraints of a given test suite. In one implementation, the script analyzer system 800 encodes modularization constraints when defining test scripts using the keyword constraints as part of a global comment in each test script. These constraints define GAPs and their GUI screens as well as other test scripts with which a given test script may communicate. An example is a statement that specifies a constraint is "constraints screen ("Q") test_scripts("P, S"). This constraint effectively prohibits a given test script from communicating with other GAPs, GUI screens, and test scripts, except the screen Q and test scripts P and S, explicitly or implicitly. In one implementation, the constraint satisfaction engine 188 ensures that such constraints are not violated by maintaining constraint satisfaction rules 832 imposed on test scripts and GAPs, and the constraint satisfaction engine 188 issues change guide messages 838 when these constraints are violated.

The time complexity of the path traversal logic 824, constraint satisfaction engine 188 and GUI class rules logic 828 is exponential to the size of the type graph for each transformed test script 178. Because the path traversal logic 824, constraint satisfaction engine 188 and GUI class rules logic 828 involve the search of one or more nodes and edges in the type graph that contains cycles for each node in the strategy, the time complexity is $O((V+E)^{max|\pi|})$ where V is the number of nodes, E is the number of edges in the type graph, and $max(|\pi|)$ is the maximum number of nodes in strategies. The operations of storing successors in the table of variables take $O(1)$. In general, the number of nodes $max(|\pi|)$ in strategies is much smaller than the number of nodes in type graphs. All graph nodes may not need to be explored for each node in a strategy. The theoretical limit on computational complexity of the path traversal logic 824, constraint satisfaction engine 188 and GUI class rules logic 828 is exponential. However, experimental evaluation shown that in practice the running time of is small for large schemas because typically path expressions are short.

The systems may be implemented in many different ways. For example, although some features are shown stored in computer-readable memories (e.g., as logic implemented as computer-executable instructions or as data structures in memory), all or part of the systems, logic, and data structures may be stored on, distributed across, or read from other machine-readable media. The media may include hard disks, floppy disks, CD-ROMs, a signal, such as a signal received from a network or partitioned into sections and received in multiple packets communicated across a network. The systems may be implemented in software, hardware, or a combination of software and hardware.

Furthermore, the systems may be implemented with additional, different, or fewer components. As one example, a processor or any other logic may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

While various embodiments of the voice detector have been described, it will be apparent to those of ordinary skill in the art that many more embodiments and implementations are possible within the scope of the invention. Accordingly, the invention is not to be restricted except in light of the attached claims and their equivalents.

What is claimed:

1. A product for test script transformation analysis for generating a transformed test script for a subsequent graphical user interface application (GAP) version arising from a current GAP version to test the subsequent GAP, the product comprising:
   a non-transitory computer readable medium;
   difference model logic stored on the machine-readable medium operable to produce a graphical user interface (GUI) difference model capturing a GUI element change from the current GAP to the subsequent GAP for a specific GUI element; and
   script analysis logic stored on the machine-readable medium operable to:
   receive the GUI difference model;
   receive a current test script representation for a current test script for testing the current GAP, including a test script statement vector;
   locate, in an object repository, a GUI object entry matching the test script statement vector;
   locate, in the GUI difference model, a GUI element difference entry matching the GUI object entry;
   analyze the GUI element difference entry to determine whether the specific GUI element has changed; and
   output a change specifier for the current test script, when the GUI element analysis determines that the GUI element has changed, where the change specifier identifies: either of a wrong path-delete type change guide message, or a wrong path-same type change guide message, or a changed-element type change guide message, or any combination thereof.

2. The product of claim 1,
   wherein the wrong path-delete type change guide message indicates that a first GUI element of the current GAP version is deleted from the subsequent GAP version.

3. The product of claim 1, wherein the wrong path-same type change guide message indicates that a first GUI element of the current GAP version and a second GUI element of the subsequent GAP version have matching identifiers, but the first and the second GUI elements do not represent the same GUI element.

4. The product of claim 1, wherein the changed-element type change guide message indicates that a first GUI element of the current GAP version and a second GUI element of the subsequent GAP version have matching identifiers, but at least one attribute of the first GUI element and the second GUI element are different.

5. The product of claim 1, wherein the script analysis logic is further operable to receive GUI element script change rules and analyze the GUI element difference entry based on the GUI element script change rules to determine whether to output the change specifier as a transformed test script statement.

6. The product of claim 1, wherein the script analysis logic is further operable to receive GUI element script change rules and analyze the GUI element difference entry based on the GUI element script change rules to obtain the change specifier as a transformed test script statement.

7. The product of claim 6, wherein the transformed test script statement facilitates a test of a display property of the subsequent GAP.

8. The product of claim 6, wherein the transformed test script statement facilitates a test of a navigation operation of the subsequent GAP.

9. The product of claim 6, wherein the transformed test script statement facilitates a test of an action of the subsequent GAP.

10. A system for test script transformation analysis for generating a transformed test script for a subsequent graphical user interface application (GAP) version arising from a current GAP version to test the subsequent GAP, the system comprising:
- a processor;
- a non-transitory memory coupled to the processor, the memory comprising:
- difference model logic operable to produce a graphical user interface (GUI) difference model capturing a GUI element change from the current GAP to the subsequent GAP for a specific GUI element; and
- script analysis logic operable to:
  - receive the GUI difference model;
  - receive a current test script representation for a current test script for testing the current GAP, including a test script statement vector;
  - locate, in an object repository, a GUI object entry matching the test script statement vector;
  - locate, in the GUI difference model, a GUI element difference entry matching the GUI object entry;
  - analyze the GUI element difference entry to determine whether the specific GUI element has changed; and
  - output a change specifier for the current test script, when the GUI element analysis determines that the GUI element has changed, where the change specifier identifies: either of a wrong path-delete type change guide message, or a wrong path-same type change guide message, or a changed-element type change guide message, or any combination thereof.

11. The system of claim 10, wherein the wrong path-delete type change guide message indicates that a first GUI element of the current GAP version is deleted from the subsequent GAP version.

12. The system of claim 10, wherein the wrong path-same type change guide message indicates that a first GUI element of the current GAP version and a second GUI element of the subsequent GAP version have matching identifiers, but the first and the second GUI elements do not represent the same GUI element.

13. The system of claim 10, wherein the changed-element type change guide message indicates that a first GUI element of the current GAP version and a second GUI element of the subsequent GAP version have matching identifiers, but at least one attribute of the first GUI element and the second GUI element are different.

14. The system of claim 10, wherein the script analysis logic is further operable to receive GUI element script change rules and analyze the GUI element difference entry based on the GUI element script change rules to determine whether to output the change specifier as a transformed test script statement.

15. The system of claim 10, wherein the script analysis logic is further operable to receive GUI element script change rules and analyze the GUI element difference entry based on the GUI element script change rules to obtain the change specifier as a transformed test script statement.

16. A method for test script transformation analysis for generating a transformed test script for a subsequent graphical user interface application (GAP) version arising from a current GAP version to test the subsequent GAP, the method comprising:
- producing a graphical user interface (GUI) difference model capturing a GUI element change from the current GAP to the subsequent GAP for a specific GUI element;
- receiving the GUI difference model;
- receiving a current test script representation for a current test script for testing the current GAP, including a test script statement vector;
- locating in an object repository, a GUI object entry matching the test script statement vector;
- locating in the GUI difference model, a GUI element difference entry matching the GUI object entry;
- analyzing the GUI element difference entry to determine whether the specific GUI element has changed; and
- outputting a change specifier for the current test script, when the GUI element analysis determines that the GUI element has changed, where the change specifier identifies: either of a wrong path-delete type change guide message, or a wrong path-same type change guide message, or a changed-element type change guide message, or any combination thereof.

17. The method of claim 16, wherein the wrong path-delete type change guide message indicates that a first GUI element of the current GAP version is deleted from the subsequent GAP version.

18. The method of claim 16, wherein the wrong path-same type change guide message indicates that a first GUI element of the current GAP version and a second GUI element of the subsequent GAP version have matching identifiers, but the first and the second GUI elements do not represent the same GUI element.

19. The method of claim 16, wherein the changed-element type change guide message indicates that a first GUI element of the current GAP version and a second GUI element of the subsequent GAP version have matching identifiers, but at least one attribute of the first GUI element and the second GUI element are different.

20. The method of claim 16, further comprising analyzing the GUI element difference entry based on GUI element script change rules to determine whether to output the change specifier as a transformed test script statement.

21. The method of claim 16, further comprising analyzing the GUI element difference entry based on GUI element script change rules to obtain the change specifier as a transformed test script statement.

* * * * *